(12) United States Patent
Chida

(10) Patent No.: US 10,732,444 B2
(45) Date of Patent: Aug. 4, 2020

(54) DISPLAY DEVICE

(71) Applicant: Sharp Kabushiki Kaisha, Sakai, Osaka (JP)

(72) Inventor: Mitsuru Chida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/469,667

(22) PCT Filed: Dec. 14, 2017

(86) PCT No.: PCT/JP2017/044805
§ 371 (c)(1),
(2) Date: Jun. 14, 2019

(87) PCT Pub. No.: WO2018/116939
PCT Pub. Date: Jun. 28, 2018

(65) Prior Publication Data
US 2019/0310502 A1 Oct. 10, 2019

(30) Foreign Application Priority Data
Dec. 21, 2016 (JP) .................... 2016-247905

(51) Int. Cl.
G02F 1/133 (2006.01)
G02F 1/1337 (2006.01)
(Continued)

(52) U.S. Cl.
CPC ........ *G02F 1/13306* (2013.01); *G02F 1/1368* (2013.01); *G02F 1/133711* (2013.01);
(Continued)

(58) Field of Classification Search
CPC .......... G02F 1/13306; G02F 1/133711; G02F 1/1368; G02F 2201/121; G02F 2201/123;
(Continued)

(56) References Cited

U.S. PATENT DOCUMENTS

2002/0180673 A1 12/2002 Tsuda et al.
2005/0140632 A1 6/2005 Tsuda et al.
(Continued)

FOREIGN PATENT DOCUMENTS

JP 2001-312253 A 11/2001
JP 2015-75723 A 4/2015
WO 2013/115088 A1 8/2013

OTHER PUBLICATIONS

Official Communication issued in International Patent Application No. PCT/JP2017/044805, dated Mar. 13, 2018.

*Primary Examiner* — Michael Pervan
(74) *Attorney, Agent, or Firm* — Keating & Bennett, LLP

(57) ABSTRACT

A display device includes a display part; a driving part; and a display control part, the display control part being configured to provide a transition period between first and second driving periods in switching from the first driving period to the second driving period, the first driving period allowing the display part to be driven at a first frame frequency, the second driving period allowing the display part to be driven at a second frame frequency, the transition period including a period where the display part is driven at at least one frame frequency with a value between the first and second frame frequencies, the transition period including positive and negative periods that last for different total durations, the positive period allowing the display part to be driven at a positive voltage, the negative period allowing the display part to be driven at a negative voltage.

18 Claims, 15 Drawing Sheets

(51) Int. Cl.
  *G02F 1/1368* (2006.01)
  *G09G 3/36* (2006.01)
  *G09G 3/20* (2006.01)

(52) U.S. Cl.
  CPC ............... *G09G 3/20* (2013.01); *G09G 3/36* (2013.01); *G09G 3/3648* (2013.01); *G09G 3/3677* (2013.01); *G02F 2201/121* (2013.01); *G02F 2201/123* (2013.01); *G09G 2320/0247* (2013.01)

(58) Field of Classification Search
  CPC .......... G09G 3/20; G09G 3/36; G09G 3/3648; G09G 3/3677; G09G 2320/0247
  See application file for complete search history.

(56) References Cited

U.S. PATENT DOCUMENTS

| | | | |
|---|---|---|---|
| 2008/0055218 A1 | 3/2008 | Tsuda et al. | |
| 2013/0271436 A1* | 10/2013 | Shiomi | G09G 3/3648 345/204 |
| 2014/0368484 A1 | 12/2014 | Tanaka et al. | |
| 2015/0102988 A1 | 4/2015 | Suzuki et al. | |
| 2015/0103104 A1* | 4/2015 | Lee | G09G 3/3648 345/690 |
| 2015/0243232 A1* | 8/2015 | Kim | G09G 3/3648 345/214 |
| 2016/0005368 A1 | 1/2016 | Park et al. | |
| 2016/0035322 A1* | 2/2016 | Tanaka | G09G 3/3648 345/206 |
| 2016/0210919 A1* | 7/2016 | Nakanishi | G09G 3/3614 |
| 2017/0004793 A1 | 1/2017 | Suzuki et al. | |

\* cited by examiner

DISPLAY DEVICE

TECHNICAL FIELD

The present invention relates to display devices. More specifically, the present invention relates to alternating current (AC) driven display devices.

BACKGROUND ART

Display devices such as liquid crystal display devices are used in applications such as TVs, smartphones, tablet PCs, PCs, and automotive navigation systems. In the field of display devices for mobile terminals, particularly, low power consumption is required as well as improved display quality and thus various techniques have been proposed (e.g., Patent Literatures 1 to 3).

CITATION LIST

Patent Literature

Patent Literature 1: JP 2001-312253 A
Patent Literature 2: JP 2015-75723 A
Patent Literature 3: WO 2013/115088

SUMMARY OF INVENTION

Technical Problem

Even in a conventional display device that causes no flickers in a mode providing moving images and a mode providing still images, flickers still may occur when the frame frequency is changed between a moving image and a still image, leading to deteriorated display quality. The present inventor made various studies to find the causes of this, which are described in the following referring to a liquid crystal display device as an example.

In a liquid crystal display device, continuous drive at direct current voltage (DC voltage) causes accumulation of charge or chemical reaction (e.g., redox reaction) in members such as a liquid crystal layer (liquid crystal material) and an electrode to deteriorate the display properties. In response to this, a driving method is typically employed in which the polarity of applied voltage is alternately switched between positive and negative polarities for each frame, whereby direct current voltage component applied to the liquid crystal layer is made almost zero. Unfortunately, in the case where the liquid crystal layer (liquid crystal molecules) shows different response performance depending on the polarity of the voltage applied (positive voltage or negative voltage), even when the positive and negative voltages applied to the liquid crystal layer have the same absolute value, the light transmittances of the liquid crystal layer corresponding to these voltages are different from each other. This unfortunately provides images with varied luminances, leading to flickers due to the variation in brightness for each frame. Accordingly, in order to make the light transmittance of the liquid crystal layer constant for each frame, the positive and negative voltages (absolute values) applied to the liquid crystal layer, which are substantially equal to each other, is shifted to have different absolute values. This shifting can be achieved by adjusting the positive and negative voltages (absolute values) or adjusting the voltage applied to the common electrode (hereinafter, also referred to as common voltage). This enables the liquid crystal layer to have an almost constant light transmittance, leading to minimized flickers. The common voltage that has been adjusted to minimize flickers is also referred to as an "optimized common voltage". The optimized common voltage enables the liquid crystal layer to have a constant light transmittance (enables images to have a constant luminance) in both cases of applying positive and negative voltages, thereby reducing flickers to an allowable level.

Even when flickers are minimized to be unrecognizable, flickers may be obviously recognized in the following case. That is, when changing the frame frequency, the voltage applied to the liquid crystal layer may be temporarily unbalanced depending on the balance of RC time constant between members such as the liquid crystal layer, an alignment film, and an insulating film. The temporary changes in the optimized common voltage (Vcom) for minimizing flickers possibly cause obvious flickers after changing the frame frequency. The phenomenon the optimized common voltage unintendedly changes for some reason is also referred to as "Vcom shift".

As mentioned above, no measure has been found which enables conventional display devices to change the frame frequency with reduced flickers.

Patent Literature 1 discloses, as a measure for achieving low power consumption, a driving method that provides a pause period where all scanning signal lines are brought to a non-scanning state after a scanning period where the screen is scanned. Unfortunately, Patent Literature 1 lacks description relating to changing the frame frequency, and thus there is still room for improvement.

Patent Literature 2 discloses a liquid crystal display device that reduces flickers during low-frequency driving and intermittent driving and including description regarding the off-leakage current of matrix patterned thin film transistor elements that control supply of voltage to liquid crystal pixels, the resistivity of liquid crystals, the resistivity of an alignment film, and a relation between the product of the resistivity and the capacitance of liquid crystals and the product of the resistivity and the capacitance of the alignment film, and the like. However, Patent Literature 2 lacks description relating to changing the frame frequency and thus there is still room for improvement.

Patent Literature 3 discloses a display device that provides a transition period where the display part is driven at a refresh rate having a value between a first value and a second value when switching the refresh rate from the first value to the second value. The transition period provides a positive period where the display part is driven at a positive voltage and a negative period where the display part is driven at a negative voltage, in substantially the same proportion as each other. The present inventor conducted intensive studies on this to found that, unfortunately, in the technique disclosed in Patent Literature 3, when the frame frequency is significantly changed, the potential of the common electrode takes a long time to reach an optimal position (the position where flickers are minimized), thereby possibly causing flickers. Thus, there is still room for improvement.

The present invention has been made under the current situation in the art and aims to provide a display device that can change the frame frequency with reduced flickers.

Solution to Problem

The present inventor made various studies on a display device that can change the frame frequency with reduced flickers and focused on a structure that provides a transition period including a period where the display part is driven at least one frame frequency between two different frame frequencies when switching between the two different frame frequencies. Then, the inventor found a structure in which the transition period includes a positive period and a negative period that last for different total durations, the positive period allowing the display part to be driven at a positive voltage, the negative period allowing the display part to be driven at a negative voltage. The inventor thereby found a successful measure to the above issue to arrive at the present invention.

In other words, an aspect of the present invention may be a display device including: a display part including a common electrode; a driving part configured to drive the display part; and a display control part configured to control the driving part, the display control part being configured to perform control for AC drive of the display part, with a voltage applied to the common electrode defined as a reference and to provide a transition period between a first driving period and a second driving period in switching from the first driving period to the second driving period, the first driving period allowing the display part to be driven at a first frame frequency, the second driving period allowing the display part to be driven at a second frame frequency different from the first frame frequency, the transition period including a period where the display part is driven at least one frame frequency with a value between the first frame frequency and the second frame frequency, the transition period including, with a voltage applied to the common electrode defined as a reference, a positive period and a negative period that last for different total durations, the positive period allowing the display part to be driven at a positive voltage, the negative period allowing the display part to be driven at a negative voltage.

At least one period selected from the group consisting of the first driving period, the second driving period, and the transition period may include a frame period including a refreshing period that refreshes a screen of the display part and a pause period that is longer than the refreshing period and stops refreshing the screen of the display part.

There may be a difference between polarity of the positive period or the negative period in the transition period, whichever has a longer total duration, and polarity of a frame period that belongs to the first driving period or the second driving period, whichever has a lower frame frequency, and is closest to the transition period.

The number of frame periods in the transition period may be 1.

Provided that $F_1$ represents the first frame frequency (unit: Hz), $F_2$ represents the second frame frequency (unit: Hz), and $F_3$ represents the frame frequency (unit: Hz) in the transition period, the frame frequencies may satisfy the following formula (1).

[Math. 1]
$$0.4 \leq \frac{F_1 F_2}{F_3(F_1 + F_2)} \leq 0.6 \qquad (1)$$

The number of frame periods in the transition period may be an even number of 2 or greater.

Provided that $F_1$ represents the first frame frequency (unit: Hz), $F_2$ represents the second frame frequency (unit: Hz), and $F_{3\_1}$, $F_{3\_2}$, ..., $F_{3\_2n-1}$, and $F_{3\_2n}$ represent frame frequencies (unit: Hz) in the transition period in the order from a first driving period side to a second driving period side, the frame frequencies may satisfy the following formula (2).

[Math. 2]
$$0.4 \leq \frac{\sum_1^n \left(\frac{1}{F_{3\_2n}} - \frac{1}{F_{3\_2n-1}}\right)}{\frac{1}{F_2} - \frac{1}{F_1}} \leq 0.6 \qquad (2)$$

In the formula (2), n is an integer of 1 or greater.

The number of frame periods in the transition period may be an odd number of 3 or greater.

Provided that $F_1$ represents the first frame frequency (unit: Hz), $F_2$ represents the second frame frequency (unit: Hz), and $F_{3\_1}$, $F_{3\_2}$, ..., $F_{3\_2n}$, and $F_{3\_2n+1}$ represent frame frequencies (unit: Hz) in the transition period in the order from a first driving period side to a second driving period side, the frame frequencies may satisfy the following formula (3).

[Math. 3]
$$0.4 \leq \frac{\frac{1}{F_{3\_1}} + \sum_1^n \left(\frac{1}{F_{3\_2n+1}} - \frac{1}{F_{3\_2n}}\right)}{\frac{1}{F_2} + \frac{1}{F_1}} \leq 0.6 \qquad (3)$$

In the formula (3), n is an integer of 1 or greater.

The first frame frequency or the second frame frequency, having a lower frame frequency, may have a frame frequency of 10 Hz or lower.

The display part may further include a thin film transistor element, and the thin film transistor element may include a semiconductor layer including an oxide semiconductor.

The display device may be a liquid crystal display device.

Advantageous Effects of Invention

The present invention can provide a display device that can change the frame frequency with reduced flickers.

DESCRIPTION OF EMBODIMENTS

The present invention is described below in more detail based on an embodiment with reference to the drawings. The embodiment, however, is not intended to limit the scope of the present invention. The configurations employed in the embodiment may appropriately be combined or modified within the spirit of the present invention.

[Embodiment]

The following is description of the structure and driving of a display device of an embodiment.

(1) Structure of Display Device

Figure 1:
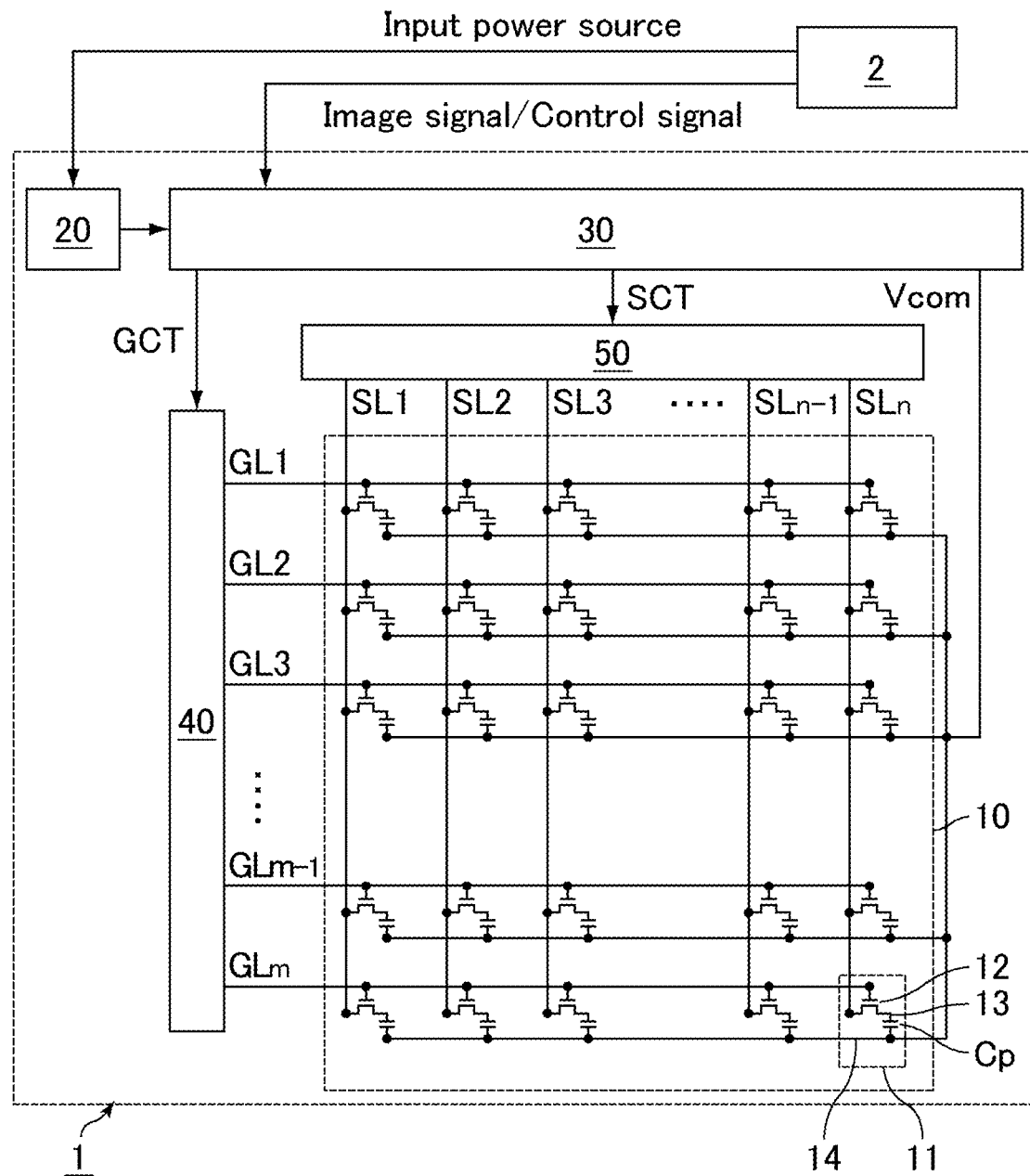
FIG. 1 is a block diagram showing the structure of a display device of an embodiment.

FIG. 1 is a block diagram showing the structure of a display device of an embodiment. As shown in FIG. 1, a display device 1 includes a display part 10, a power generation circuit 20, a display control circuit 30, a scanning line drive circuit 40, and a signal line drive circuit 50.

(Display Part)

The display part 10 includes multiple (number: m) scanning lines GL1 to GLm, multiple (number: n) signal lines SL1 to SLn, and multiple (number: m×n) pixels 11 partitioned by the scanning lines GL1 to GLm and the signal lines SL1 to SLn.

The pixels 11 each include a thin film transistor element 12, a pixel electrode 13, and a common electrode 14. The thin film transistor element 12 includes a gate terminal connected to the corresponding scanning line (e.g., scanning line GLm), a source terminal connected to the corresponding signal line (e.g., signal line SLn), and a drain terminal connected to the pixel electrode 13. The common electrode 14 is provided electrically commonly over the multiple (number: m×n) pixels 11. Between each pixel electrode 13 and the common electrode 14 is formed a pixel capacitance Cp.

Examples of the material for a semiconductor layer included in the thin film transistor element 12 include amorphous silicon, polycrystalline silicon, and an oxide semiconductor. Among these, an oxide semiconductor is preferred in terms of simultaneously achieving low power consumption and high-speed driving. The oxide semiconductor can achieve low power consumption owing to a small amount of off-leakage current (the amount of leakage current when the thin film transistor element 12 is turned off) and can also achieve high-speed driving owing to a large amount of on current (the amount of current when the thin film transistor element 12 is turned on). Examples of the material for the oxide semiconductor include a compound including indium, gallium, zinc, and, oxygen and a compound including indium, zinc, and oxygen.

In the case where the display device 1 is a liquid crystal display device, structure examples of the pixels 11 include the following.

STRUCTURE EXAMPLE 1

Structure Example 1 relates to a fringe field switching (FFS) mode liquid crystal display device.

Figure 2:
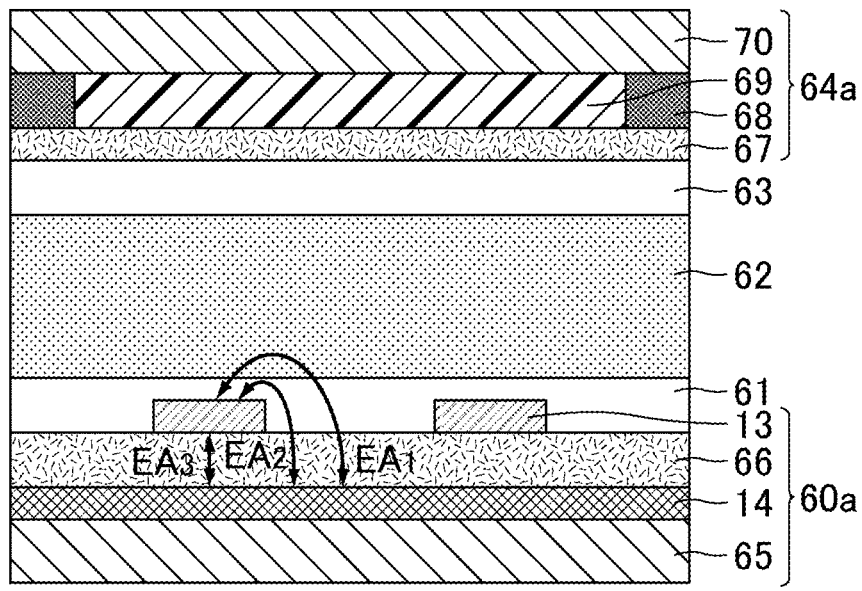
FIG. 2 is a schematic cross-sectional view of Structure Example 1 of a pixel in FIG. 1.

FIG. 2 is a schematic cross-sectional view of Structure Example 1 of a pixel in FIG. 1. In Structure Example 1, as shown in FIG. 2, a first substrate 60a, a first alignment film 61, a liquid crystal layer 62, a second alignment film 63, and a second substrate 64a are disposed in the stated order.

The first substrate 60a includes a first supporting substrate 65, the common electrode 14 disposed on the liquid crystal layer 62 side surface of the first supporting substrate 65, a first insulating film 66 covering the common electrode 14, and the pixel electrodes 13 disposed on the liquid crystal layer 62 side surface of the first insulating film 66.

Examples of the first supporting substrate 65 include translucent substrates such as a glass substrate, a plastic substrate, and a quartz substrate. When the liquid crystal display device is a reflective liquid crystal display device, the first supporting substrate 65 may be a substrate without translucency such as a metal substrate including a stainless steel substrate.

The common electrode 14 may be formed from an organic material or an inorganic material. Examples of the inorganic material include materials with translucency and conductivity, such as indium tin oxide (ITO) and indium zinc oxide (IZO).

The first insulating film 66 may be an organic insulating film or an inorganic insulating film. Examples of the organic insulating film include polyimide films. Examples of the inorganic insulating film include silicon nitride films, silicon oxide films, and silicon oxynitride films. The first insulating film 66 may be a single layer of one kind of insulating film or a stack of multiple kinds of insulating films. The thickness of the first insulating film 66 is about 50 to 1000 nm, for example.

The pixel electrodes 13 may be formed from an organic material or an inorganic material. Examples of the inorganic material include materials with translucency and conductivity, such as indium tin oxide (ITO) and indium zinc oxide (IZO). The pixel electrodes 13 may each be a single layer of one kind of electrode or a stack of multiple kinds of electrodes.

The first alignment film 61 and the second alignment film 63 may each be an organic alignment film or an inorganic alignment film, and examples thereof include a rubbing alignment film and a photoalignment film. Examples of the photoalignment film include a photoalignment film containing a cinnamate group, a photoalignment film containing azobenzene, and a photoalignment film containing a cyclobutane ring. The first alignment film 61 and the second alignment film 63 may each be a single layer of one kind of alignment film or a stack of multiple kinds of alignment films. When a stack of multiple kinds of alignment films is used, the liquid crystal layer 62 side layer (preferably, outermost layer on the liquid crystal layer 62 side) may mainly function to control the alignment of liquid crystal molecules, and the layer on the side remote from the liquid crystal layer 62 may mainly function to control the electrical characteristics and the mechanical strength. The thicknesses of the first alignment film 61 and the second alignment film 63 are each about 30 to 300 nm, for example. One or both of the first alignment film 61 and the second alignment film 63 may not be disposed.

The liquid crystal layer 62 may be formed from a positive liquid crystal material having positive anisotropy of dielectric constant or a negative liquid crystal material having negative anisotropy of dielectric constant. In the case of low-frequency driving (e.g., frame frequency: 20 Hz or lower), a liquid crystal material that suppresses flickers by the flexoelectric effect is preferred, that is, a negative liquid crystal material is preferred. Even in the case of low-frequency driving (e.g., frame frequency: 20 Hz or lower), a positive liquid crystal material may also be used by, for example, limiting the range of gray-scale values (e.g., limiting the range to the side of high gray-scale values only). The thickness of the liquid crystal layer 62 is about 1 to 10 µm, for example.

The second substrate 64a includes a second supporting substrate 70, a color filter 69 disposed on the liquid crystal layer 62 side surface of the second supporting substrate 70, a black matrix 68 disposed separately from the color filter 69 on the liquid crystal layer 62 side surface of the second supporting substrate 70, and a second insulating film 67 covering the color filter 69 and the black matrix 68.

Examples of the second supporting substrate 70 include translucent substrates such as a glass substrate, a plastic substrate, and a quartz substrate.

The color filter 69 may be formed of a single-color color filter layer or multi-color color filter layers. The color filter 69, when formed of a multi-color color filter layer, may have any color combination, such as a combination of red, green, and blue, a combination of red, green, blue, and yellow, and a combination of red, green, blue, and white. The color filter 69 may be formed from a material such as a pigment-dispersed color resist. The color filter 69 may not be disposed. In this case, the device can provide monochrome display. In a transverse electric field mode liquid crystal display device (e.g., the FFS mode liquid crystal display device of the present structure example, the later described in-plane switching (IPS) mode liquid crystal display device), the electrical characteristics of the color filter 69 are important as well as the optical characteristics thereof. The color filter 69 has a dielectric tangent (tan δ) of preferably 0.05 or lower, more preferably 0.03 or lower, in the range of the frame frequency to be employed.

The black matrix 68 may be formed from a material such as black resist. In a transverse electric field mode liquid crystal display device (e.g., the FFS mode liquid crystal display device of the present structure example, the later described IPS mode liquid crystal display device), the electrical characteristics of the black matrix 68 are important as well as the light blocking property and dimensional accuracy thereof. The black matrix 68 has a specific resistance of preferably $1\times10^{12}$ Ω·cm or more.

The second insulating film 67 may be formed of, for example, an overcoat layer. The second insulating film 67 may not be disposed. In a transverse electric field mode liquid crystal display device (e.g., the FFS mode liquid crystal display device of the present structure example, the later described IPS mode liquid crystal display device), the electrical characteristics of the second insulating film 67 are important as well as the light blocking property and dimensional accuracy thereof. The second insulating film 67 has a specific resistance of preferably $1\times10^{13}$ Ω·cm or more.

In Structure Example 1, voltage applied between the pixel electrodes 13 and the common electrode 14 generates transverse electric fields (fringe electric fields), thereby enabling control of the alignment of liquid crystal molecules in the liquid crystal layer 62. The structure shown in FIG. 2 may be modified by switching the positions of the pixel electrodes 13 and the common electrode 14. This structure can also achieve an FFS mode liquid crystal display device.

Figure 3:
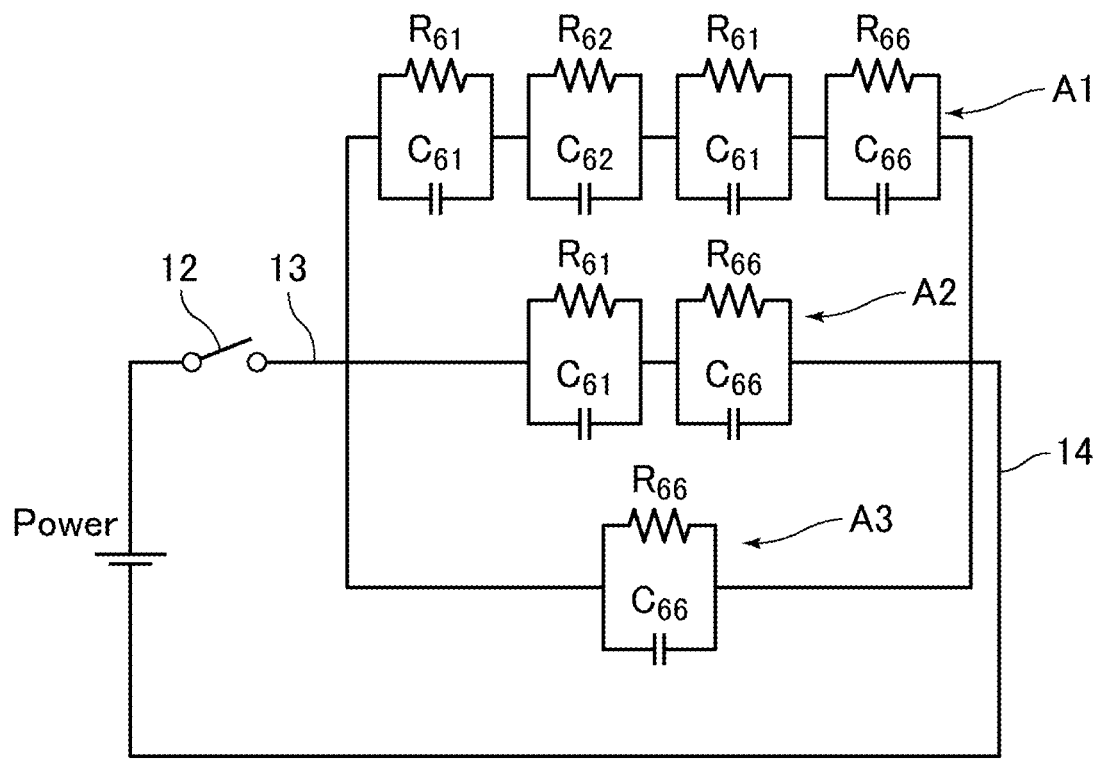
FIG. 3 is a schematic view of an equivalent circuit for simulation in Structure Example 1.

In Structure Example 1, changes with time of potential differences between the respective layers, which are caused by the electric fields generated between the pixel electrodes 13 and the common electrode 14, can be simulated in an equivalent circuit as shown in FIG. 3. FIG. 3 is a schematic view of an equivalent circuit for simulation in Structure Example 1. As shown in FIG. 3, the equivalent circuit for Structure Example 1 includes the following circuits A1 to A3 arranged in parallel.

Circuit A1: a circuit for an electric field (electric field $EA_1$ in FIG. 2) passing through the first alignment film 61, the liquid crystal layer 62, the first alignment film 61, and the first insulating film 66 in the stated order or in the reverse order Circuit A2: a circuit for an electric field (electric field $EA_2$ in FIG. 2) passing through the first alignment film 61 and the first insulating film 66 in the stated order or in the reverse order Circuit A3: a circuit for an electric field (electric field $EA_3$ in FIG. 2) passing through the first insulating film 66

In the circuit corresponding to the first alignment film 61, a capacitance $C_{61}$ of the first alignment film 61 and a resistance $R_{61}$ of the first alignment film 61 are arranged in parallel. In the circuit corresponding to the liquid crystal layer 62, a capacitance $C_{62}$ of the liquid crystal layer 62 and a resistance $R_{62}$ of the liquid crystal layer 62 are arranged in parallel. In the circuit corresponding to the first insulating film 66, a capacitance $C_{66}$ of the first insulating film 66 and a resistance $R_{66}$ of the first insulating film 66 are arranged in parallel. FIG. 3 shows a state where the thin film transistor element 12 is turned off.

STRUCTURE EXAMPLE 2

Structure Example 2 relates to an IPS mode liquid crystal display device. Structure Example 2 is the same as Structure Example 1 except for the first substrate. Duplicate explanations thus will be appropriately omitted.

Figure 4:
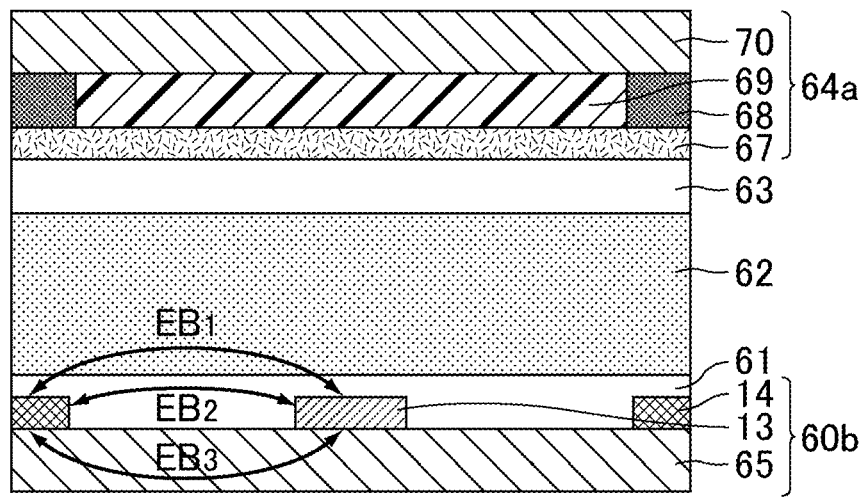
FIG. 4 is a schematic cross-sectional view of Structure Example 2 of a pixel in FIG. 1.

FIG. 4 is a schematic cross-sectional view of Structure Example 2 of a pixel in FIG. 1. In Structure Example 2, as shown in FIG. 4, a first substrate 60b, the first alignment film 61, the liquid crystal layer 62, the second alignment film 63, and the second substrate 64a are disposed in the stated order.

The first substrate 60b includes the first supporting substrate 65, the pixel electrodes 13 disposed on the liquid crystal layer 62 side surface of the first supporting substrate 65, and the common electrode 14 disposed separately from the pixel electrodes 13 on the liquid crystal layer 62 side surface of the first supporting substrate 65.

In Structure Example 2, voltage applied between the pixel electrodes 13 and the common electrode 14 generates transverse electric fields, thereby enabling control of the alignment of liquid crystal molecules in the liquid crystal layer 62.

Figure 5:
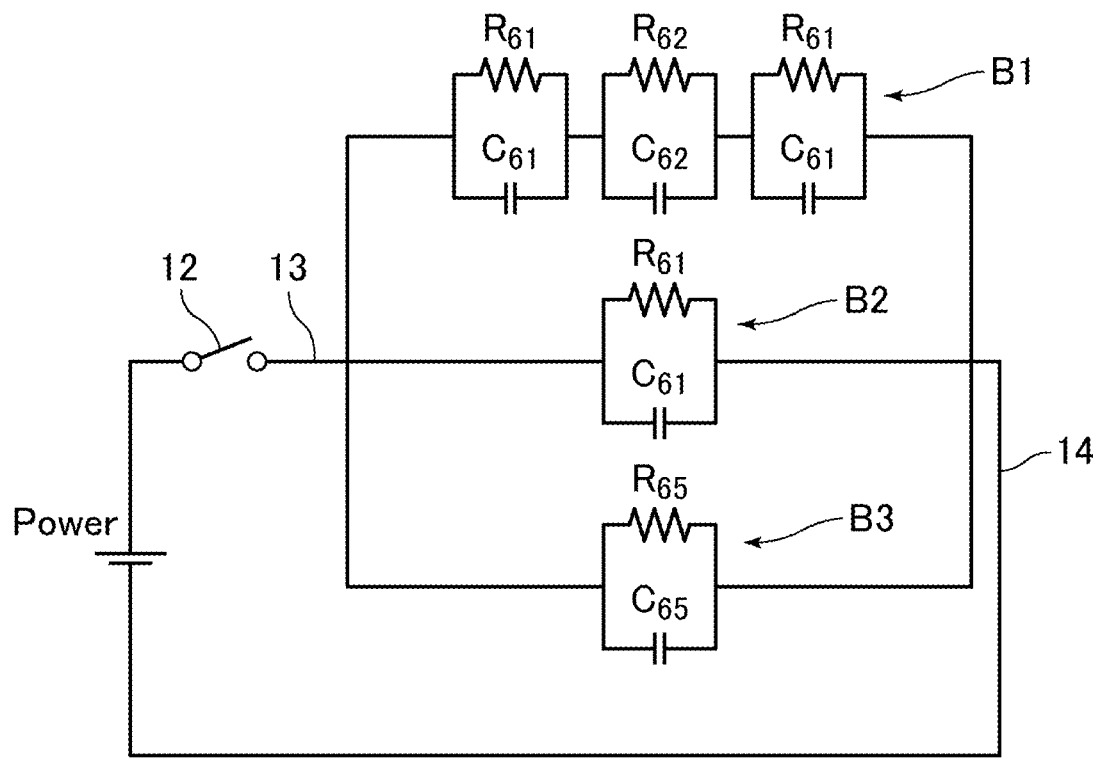
FIG. 5 is a schematic view of an equivalent circuit for simulation in Structure Example 2.

In Structure Example 2, changes with time of potential differences between the respective layers, which are caused by the electric fields generated between the pixel electrodes 13 and the common electrode 14, can be simulated by an equivalent circuit as shown in FIG. 5. FIG. 5 is a schematic view of an equivalent circuit for simulation in Structure Example 2. As shown in FIG. 5, the equivalent circuit for Structure Example 2 includes the following circuits B1 to B3 arranged in parallel.

Circuit B1: a circuit for an electric field (electric field $EB_1$ in FIG. 4) passing through the first alignment film 61, the liquid crystal layer 62, and the first alignment film 61 in the stated order or in the reverse order Circuit B2: a circuit for an electric field (electric field $EB_2$ in FIG. 4) passing through the first alignment film 61

Circuit B3: a circuit for an electric field (electric field $EB_3$ in FIG. 4) passing through the first supporting substrate 65

In the circuit corresponding to the first supporting substrate 65, a capacitance $C_{65}$ of the first supporting substrate 65 and a resistance $R_{65}$ of the first supporting substrate 65 are arranged in parallel.

STRUCTURE EXAMPLE 3

Structure Example 3 relates to an IPS mode liquid crystal display device. Structure Example 3 is the same as Structure Example 2 except for the first substrate. Duplicate explanations thus will be appropriately omitted.

Figure 6:
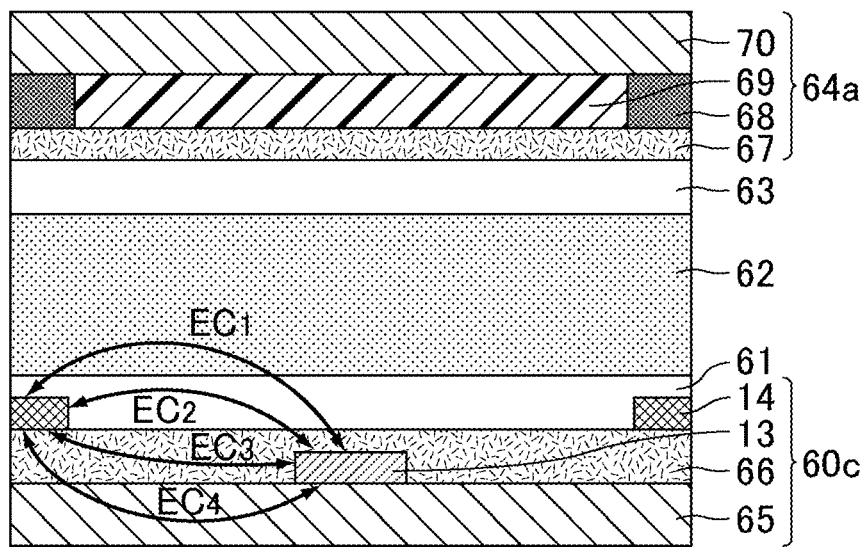
FIG. 6 is a schematic cross-sectional view of Structure Example 3 of a pixel in FIG. 1.

FIG. 6 is a schematic cross-sectional view of Structure Example 3 of a pixel in FIG. 1. In Structure Example 3, as shown in FIG. 6, a first substrate 60c, the first alignment film 61, the liquid crystal layer 62, the second alignment film 63, and the second substrate 64a are disposed in the stated order.

The first substrate 60c includes the first supporting substrate 65, the pixel electrodes 13 disposed on the liquid crystal layer 62 side surface of the first supporting substrate 65, the first insulating film 66 covering the pixel electrodes 13, and the common electrode 14 disposed on the liquid crystal layer 62 side surface of the first insulating film 66.

In Structure Example 3, voltage applied between the pixel electrodes 13 and the common electrode 14 generates transverse electric fields, thereby enabling control of the alignment of liquid crystal molecules in the liquid crystal layer 62.

Figure 7:
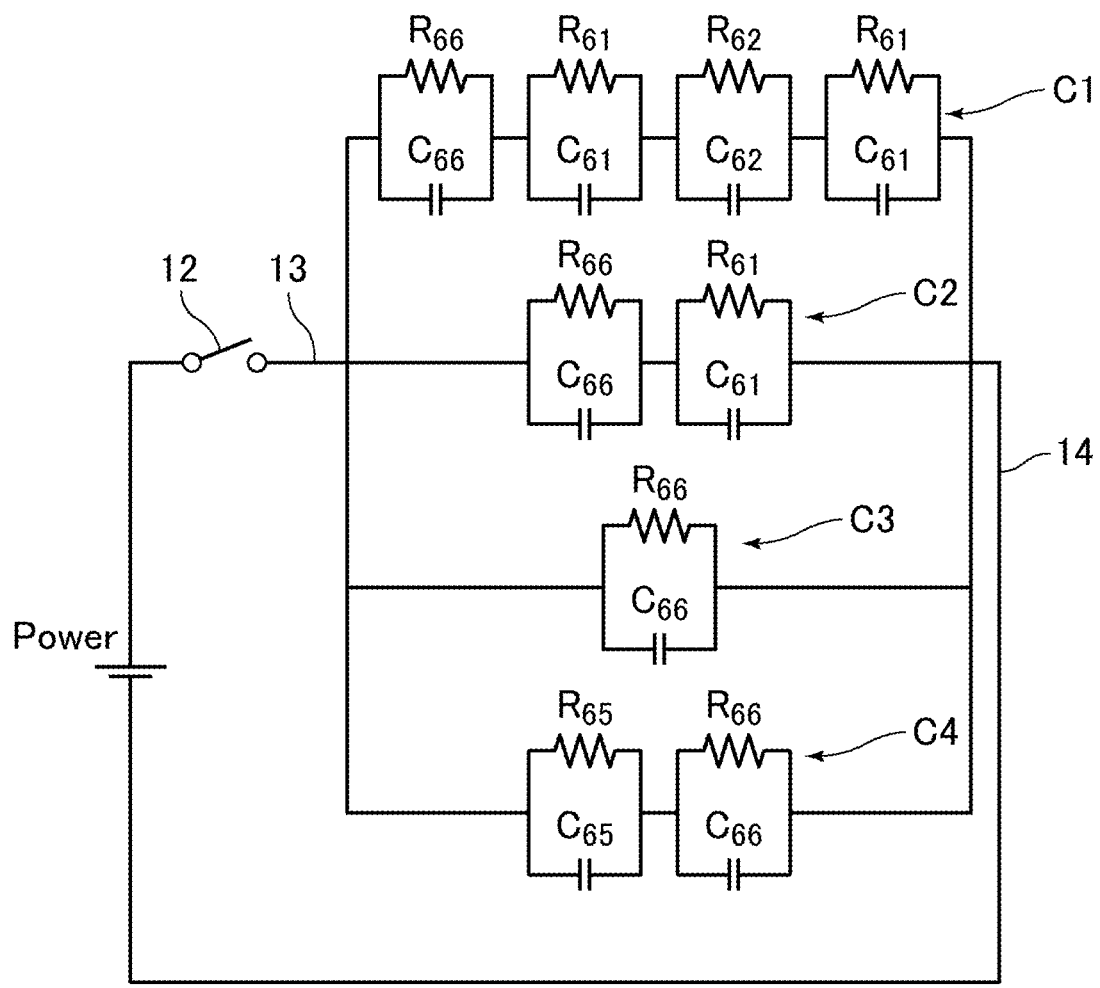
FIG. 7 is a schematic view of an equivalent circuit for simulation in Structure Example 3.

In Structure Example 3, changes with time of potential differences between the respective layers, which are caused by the electric fields generated between the pixel electrodes 13 and the common electrode 14, can be simulated by an equivalent circuit as shown in FIG. 7. FIG. 7 is a schematic view of an equivalent circuit for simulation in Structure Example 3. As shown in FIG. 7, the equivalent circuit for Structure Example 3 includes the following circuits C1 to C4 arranged in parallel.

Circuit C1: a circuit for an electric field (electric field $EC_1$ in FIG. 6) passing through the first insulating film 66, the first alignment film 61, the liquid crystal layer 62, and the first alignment film 61 in the stated order or in the reverse order Circuit C2: a circuit for an electric field (electric field $EC_2$ in FIG. 6) passing through the first insulating film 66 and the first alignment film 61 in the stated order or in the reverse order Circuit C3: a circuit for an electric field (electric field $EC_3$ in FIG. 6) passing through the first insulating film 66

Circuit C4: a circuit for an electric field (electric field $EC_4$ in FIG. 6) passing through the first supporting substrate 65 and the first insulating film 66 in the stated order or in the reverse order

STRUCTURE EXAMPLE 4

Structure Example 4 relates to a twisted nematic (TN) mode liquid crystal display device and a vertical alignment (VA) mode liquid crystal display device. Structure Example 4 is the same as Structure Example 1 except for the first substrate and the second substrate. Duplicate explanations thus will be appropriately omitted.

Figure 8:
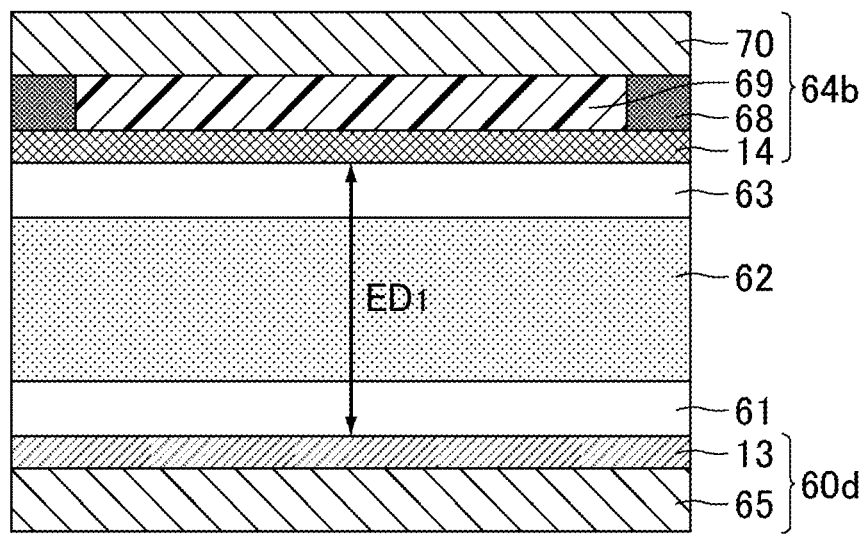
FIG. 8 is a schematic cross-sectional view of Structure Example 4 of a pixel in FIG. 1.

FIG. 8 is a schematic cross-sectional view of Structure Example 4 of a pixel in FIG. 1. In Structure Example 4, as shown in FIG. 8, a first substrate 60d, the first alignment film 61, the liquid crystal layer 62, the second alignment film 63, and a second substrate 64b are disposed in the stated order. One of the first alignment film 61 and the second alignment film 63 may not be disposed.

The first substrate 60d includes the first supporting substrate 65 and the pixel electrodes 13 disposed on the liquid crystal layer 62 side surface of the first supporting substrate 65.

The second substrate 64b includes the second supporting substrate 70, the color filter 69 disposed on the liquid crystal layer 62 side surface of the second supporting substrate 70, the black matrix 68 disposed separately from the color filter 69 on the liquid crystal layer 62 side surface of the second supporting substrate 70, and the common electrode 14 covering the color filter 69 and the black matrix 68.

In Structure Example 4, voltage applied between the pixel electrodes 13 and the common electrode 14 generates a vertical electric field, thereby enabling control of the alignment of liquid crystal molecules in the liquid crystal layer 62.

Figure 9:
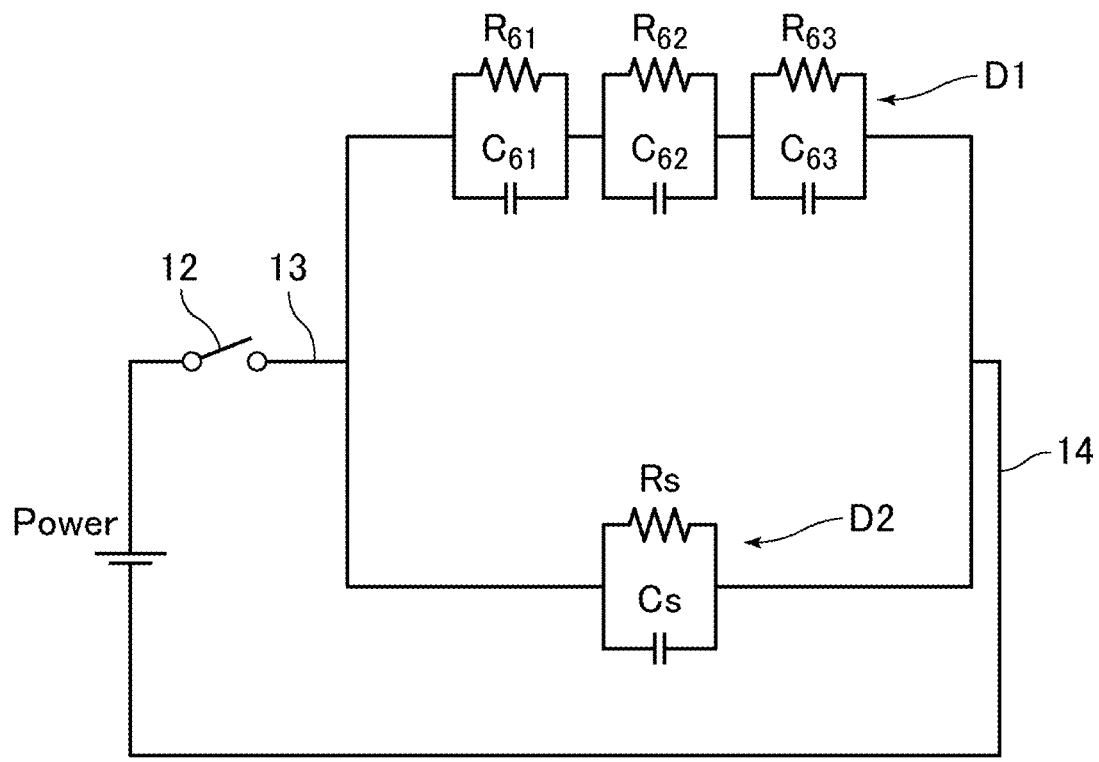
FIG. 9 is a schematic view of an equivalent circuit for simulation in Structure Example 4.

In Structure Example 4, changes with time of potential differences between the respective layers, which are caused by the electric field generated between the pixel electrodes 13 and the common electrode 14, can be simulated by an equivalent circuit as shown in FIG. 9. FIG. 9 is a schematic view of an equivalent circuit for simulation in Structure Example 4. As shown in FIG. 9, the equivalent circuit for Structure Example 4 includes the following circuits D1 and D2 arranged in parallel.

Circuit D1: a circuit for an electric field (electric field $ED_1$ in FIG. 8) passing through the first alignment film 61, the liquid crystal layer 62, and the second alignment film 63 in the stated order or in the reverse order Circuit D2: a circuit corresponding to a storage capacitance Cs In the circuit corresponding to the second alignment film 63, a capacitance $C_{63}$ of the second alignment film 63 and a resistance $R_{63}$ of the second alignment film 63 are arranged in parallel. In the circuit corresponding to the storage capacitance Cs, the storage capacitance Cs (capacitance due to an insulating film between the pixel electrodes 13 and the gate electrode (e.g., gate insulator, interlayer insulating film)) and a resistance Rs are arranged in parallel.

(Power Generation Circuit)

The power generation circuit 20 generates voltage based on input power source supplied from the outside (in FIG. 1, the system control unit 2) and supplies the voltage to the display control circuit 30.

(Display Control Circuit)

The display control circuit 30 constitutes the display control part of the display device 1. First, the display control circuit 30 generates a scanning line control signal GCT, a signal line control signal SCT, and a common voltage Vcom, based on image signals and control signals input from the outside (in FIG. 1, the system control unit 2). The display control circuit 30 then outputs the scanning line control signal GCT to the scanning line drive circuit 40, the signal line control signal SCT to the signal line drive circuit 50, and the common voltage Vcom to the common electrode 14.

(Scanning Line Drive Circuit)

The scanning line drive circuit 40 constitutes the driving part of the display device 1. The scanning line drive circuit 40 generates a scanning signal based on the scanning line control signal GCT and outputs the scanning signal to the scanning lines GL1 to GLm. The scanning signal allows the scanning line drive circuit 40 to sequentially select and scan the scanning lines GL1 to GLm.

(Signal Line Drive Circuit)

The signal line drive circuit 50 constitutes the driving part of the display device 1. The signal line drive circuit 50 generates an image signal for driving based on the signal line control signal SCT and outputs the image signal for driving to the signal lines SL1 to SLn. As a result, for example, when the scanning line GLm is selected by the scanning line drive circuit 40, the image signal for driving is input into the respective pixels 11 corresponding to the scanning line GLm through the signal lines SL1 to SLn.

(2) Driving of Display Device

Figure 10:
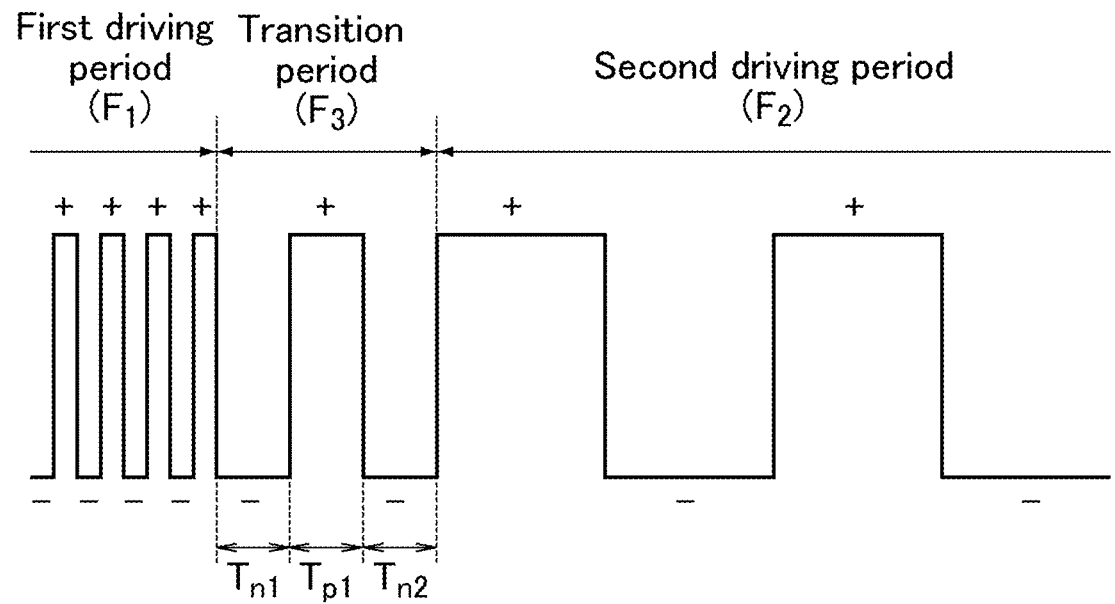
FIG. 10 is a schematic view showing an example of a waveform of an image signal for driving in the display device of the embodiment.

FIG. 10 is a schematic view showing an example of a waveform of an image signal for driving in the display device of the embodiment. Although the amplitude of an image signal for driving usually changes in accordance with the change of gray scale values, FIG. 10 shows a state without the change of the gray scale values, where only the frequency of the image signal for driving changes, for convenience. The following description also appropriately refers to FIGS. 1 to 9.

The display control circuit 30 performs control for AC drive of the display part 10, with a voltage applied to the common electrode 14 defined as a reference. The term "AC drive" as used herein means alternate driving between a positive voltage and a negative voltage with a voltage applied to the common electrode 14 defined as a reference. The term "positive" as used herein means polarity of a voltage higher than the voltage applied to the common electrode 14. The term "negative" as used herein means polarity of a voltage lower than the voltage applied to the common electrode 14. FIG. 10 shows the polarities of driving voltage with the voltage applied to the common electrode 14 defined as a reference, and "+" represents positive and "−" represents negative (the same shall apply to the other drawings).

The method for AC drive is not particularly limited. Examples thereof include a frame inversion method in which the polarities of all the pixels are inverted to the same polarity at once for each frame, a line inversion method in which the polarities of pixels in adjacent rows are inverted to opposite polarities for each frame, a column inversion method in which the polarities of pixels in adjacent columns are inverted to opposite polarities for each frame, a dot inversion method in which the polarities of adjacent pixels are inverted to opposite polarities for each frame, and a method in which the polarities of two adjacent units each including a plurality of pixels in the row direction or in the column direction are inverted to opposite polarities for each frame.

The display control circuit 30 provides a transition period between a first driving period and a second driving period in switching from the first driving period to the second driving period (e.g., switching between a moving image and a still image). The first driving period allows the display part 10 to be driven at a first frame frequency $F_1$. The second driving period allows the display part 10 to be driven at a second frame frequency $F_2$ different from the first frame frequency $F_1$. The transition period includes a period where the display part 10 is driven at least one frame frequency with a value between the first frame frequency $F_1$ and the second frame frequency $F_2$. Here, the phrase "a value between X and Y" as used herein means "a value higher than X and lower than Y" (in the case of X<Y), or "a value higher than Y and lower than X" (in the case of Y<X).

FIG. 10 includes, as a transition period, a period where the display part 10 is driven at a frame frequency $F_3$, where $F_2<F_3<F_1$. The transition period includes, with the voltage applied to the common electrode 14 defined as a reference, a positive period where the display part 10 is driven at a positive voltage and a negative period where the display part 10 is driven at a negative voltage. The positive period in the transition period includes one frame period (length (time): $T_{p1}$). The negative period in the transition period includes two frame periods (length (time): $T_{n1}$, $T_{n2}$). In the transition period, provided that $T_p$ represents the total duration of the positive period and $T_n$ represents the total duration of the negative period, $T_p$ and $T_n$ are expressed by the following formulas (a) and (b). $T_p$ and $T_n$ have different values ($T_p<T_n$).

$$T_p=T_{p1} \tag{a}$$

$$T_n=T_{n1}+T_{n2} \tag{b}$$

When there is a difference between the total duration of the positive period $T_p$ and the total duration of the negative period $T_n$ in the transition period as in the present embodiment, Vcom shift when switching from the first frame frequency $F_1$ (first driving period) to the second frame frequency $F_2$ (second driving period) can be suppressed. This results in suppression of flickers. For example, when the display device 1 is a liquid crystal display device, suppression of variation in effective voltage applied to the liquid crystal layer 62 enables suppression of Vcom shift.

Figure 11:
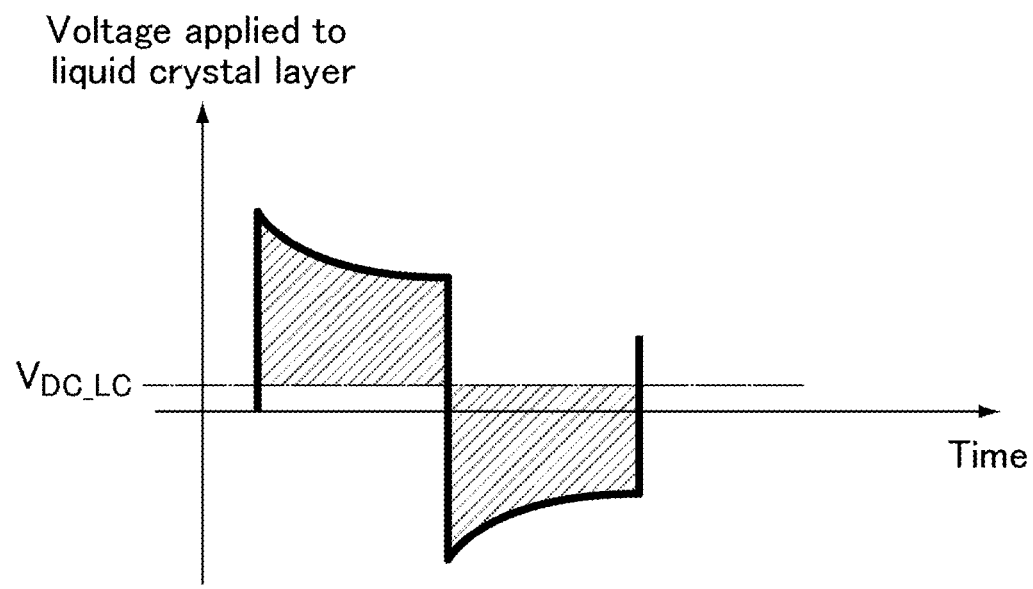
FIG. 11 is a graph showing an example of voltage applied to a liquid crystal layer.

The phrase "effective voltage applied to the liquid crystal layer" is also referred to as "a DC voltage component applied to the liquid crystal layer". The phrase "a DC voltage component applied to the liquid crystal layer" means a DC voltage $V_{DC\_LC}$ corresponding to a reference voltage applied to the liquid crystal layer, at which, as schematically shown in FIG. 11, the area of the positive frame period and the area of the negative frame period are equal to each other. FIG. 11 is a graph showing an example of voltage applied to the liquid crystal layer.

Although the first frame frequency $F_1$, the second frame frequency $F_2$, and the frame frequency $F_3$ in the transition period satisfy the relation of: $F_2<F_3<F_1$ (switching from a high frequency ($F_1$) to a low frequency ($F_2$)) in FIG. 10, they may satisfy the relation of: $F_1<F_3<F_2$ (switching from a low frequency ($F_1$) to a high frequency ($F_2$)).

Although the frame frequency in the transition period includes one frame frequency $F_3$ in FIG. 10, it may include multiple frame frequencies. In this case, at least one of the multiple frame frequencies may have a value between the first frame frequency $F_1$ and the second frame frequency $F_2$.

In the present embodiment, the term "frame period" means a period from driving at a voltage with a certain polarity (e.g., writing a voltage with a certain polarity) to driving at a voltage with the counter polarity thereof (e.g., writing a voltage with the counter polarity thereof), and the term "frame frequency" means the reciprocal number of the length (time) of the period. The term "driving" as used herein includes at least driving for refreshing the screen of the display part 10 and may also include driving for pausing in refreshing the screen of the display part 10. A period for refreshing the screen of the display part 10 is referred to as a "refreshing period", and a period for pausing in refreshing the screen of the display part 10 is referred to as a "pause period". The frame period may include refreshing period(s) only or may include refreshing period(s) and pause period(s).

In the refreshing period, the signal line drive circuit 50 outputs an image signal for driving to the signal lines SL1 to SLn, and the scanning line drive circuit 40 sequentially selects and scans the scanning lines GL1 to GLm with a scanning signal. When the scanning line GLm is selected, for example, each thin film transistor element 12 corresponding to the scanning line GLm is turned on, and then a voltage for an image signal for driving is written to the corresponding pixel 11 (pixel capacitance Cp). Thereby, the screen of the display part 10 is refreshed. Then, when the display device 1 is a liquid crystal display device, for example, the thin film transistor element 12 is turned off. Here, the written voltage may be regarded as being practically held until the next refreshment of the screen of the display part 10 as long as the off-leakage current of the thin film transistor element 12 is low, the leakage currents of members such as the liquid crystal layer, the alignment film, and the insulating film are low, and the RC time constants of members such as the liquid crystal layer, the alignment film, and the insulating film are balanced.

In the pause period, one or both of the scanning line drive circuit 40 and the signal line drive circuit 50 pauses. For example, the scanning line drive circuit 40 pauses when output of the scanning line control signal GCT to the scanning line drive circuit 40 stops or the scanning line control signal GCT has a fixed potential. Similarly, the signal line drive circuit 50 pauses when output of the signal line control signal SCT to the signal line drive circuit 50 stops or the signal line control signal SCT has a fixed potential. As a result, the scanning lines GL1 to GLm are not scanned and no image signal for driving is written to the pixels 11 (pixel capacitances Cp). However, as described above, in the pause period, the voltage having been written in the refreshing period immediately before the pause period (specifically, the last frame period in the refreshing period immediately before the pause period) is held. Thus, the image on the screen refreshed in the refreshing period immediately before the pause period (specifically, the last frame period in the refreshing period immediately before the pause period) is kept displayed. Since one or both of the scanning line drive circuit 40 and the signal line drive circuit 50 pauses in the pause period, low power consumption can be achieved.

Driving for pausing in refreshing the screen of the display part 10 after refreshing the screen of the display part 10 is also referred to as "pause driving". When pause driving is performed in a transition period, the total duration of positive period $T_p$ and the total duration of negative period $T_n$ each correspond to the total duration of the refreshing period(s) and the pause period(s). Although a waveform of an image signal for driving does not need to be one representing an image signal in a pause period when pause driving is performed, FIG. 10 shows a simple square wave for convenience.

At least one period selected from the group consisting of the first driving period, the second driving period, and the transition period may include a frame period including a refreshing period and a pause period that is longer than the refreshing period. Such pause driving can achieve lower power consumption than driving that performs refreshment only.

The transition period may include refreshing period(s) only or may include refreshing period(s) and pause period(s).

One frame period may include one or more refreshing periods. For example, when the length (time) of a frame period is one second (frame frequency: 1 Hz), a positive (negative) voltage may be written only once or multiple times during the one second.

Although the present embodiment gives an example in which switching is performed between two frame frequencies (switching from the first frame frequency $F_1$ to the second frame frequency $F_2$) as shown in FIG. 10, stepwise switching between three or more different frame frequencies is also allowable. This case includes multiple processes for changing the frame frequency. At least one of these processes may include a transition period.

Preferably, there is a difference between the polarity of the positive period or the negative period in the transition period, whichever has a longer total duration, and the polarity of a frame period that belongs to the first driving period or the second driving period, whichever has a lower frame frequency, and is closest to the transition period. Thereby, Vcom shift is more suppressed when switching from the first frame frequency $F_1$ (first driving period) to the second frame frequency $F_2$ (second driving period). This results in better suppression of flickers. A specific example having such a feature is shown in FIG. 10, which can be described as follows.

(A) One of the positive period and the negative period in the transition period, having a longer total duration, is the negative period ($T_p<T_n$) and the polarity thereof is negative.

(B) One of the first driving period and the second driving period, having a lower frame frequency, is the second driving period ($F_2<F_1$). In the second driving period, the polarity of a frame period closest to the transition period is positive.

Accordingly, the polarity of (A) and the polarity of (B) are different from each other.

Preferred relations of the frame frequencies between the first driving period, the second driving period, and the transition period are described based on the following classification examples.

CLASSIFICATION EXAMPLE 1

Classification Example 1 relates to the case where the number of frame periods in the transition period is 1.

Figure 12:
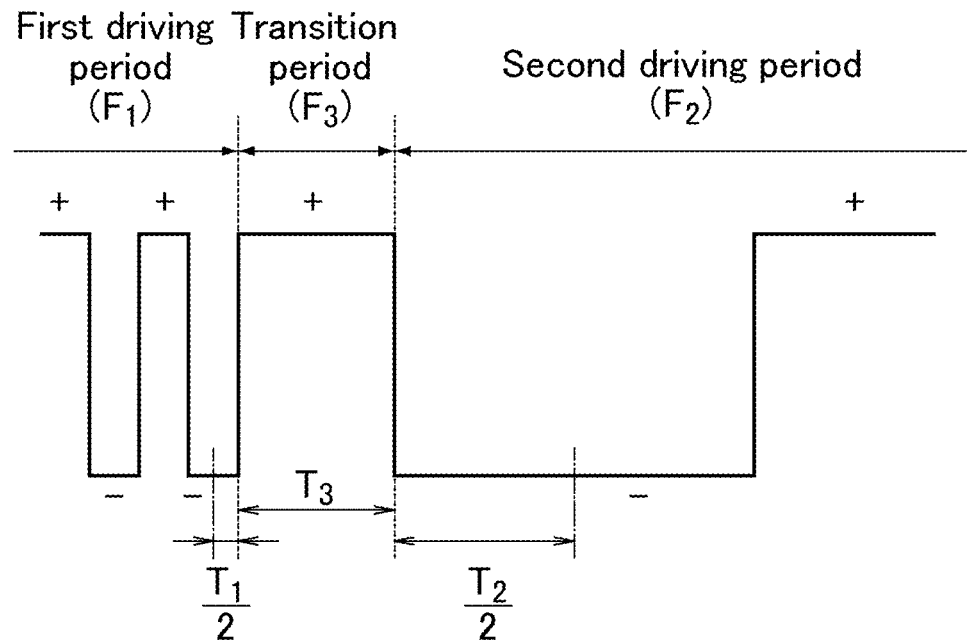
FIG. 12 is a schematic view of a waveform of an image signal for driving in Classification Example 1.

FIG. 12 is a schematic view of a waveform of an image signal for driving in Classification Example 1. FIG. 12 includes the first driving period (first frame frequency $F_1$ (unit: Hz), the length (time) $T_1$ (unit: second) of the frame period), the second driving period (second frame frequency $F_2$ (unit: Hz), the length (time) $T_2$ (unit: second) of the frame period), and the transition period (frame frequency $F_3$ (unit: Hz), the length (time) $T_3$ (unit: second) of the frame period) between the first driving period and the second driving period.

The frame frequencies preferably satisfy a relation represented by the following formula (1). In this case, Vcom shift is more suppressed when switching from the first frame frequency $F_1$ (first driving period) to the second frame frequency $F_2$ (second driving period). This results in better suppression of flickers.

[Math. 4]
$$0.4 \leq \frac{F_1 F_2}{F_3(F_1 + F_2)} \leq 0.6 \qquad (1)$$

The frame frequencies particularly preferably satisfy a relation represented by the following formula (1-1).

[Math. 5]
$$\frac{F_1 F_2}{F_3(F_1 + F_2)} = 0.5 \qquad (1\text{-}1)$$

CLASSIFICATION EXAMPLE 2

Classification Example 2 relates to the case where the number of frame periods in the transition period is an even number of 2 or greater.

Figure 13:
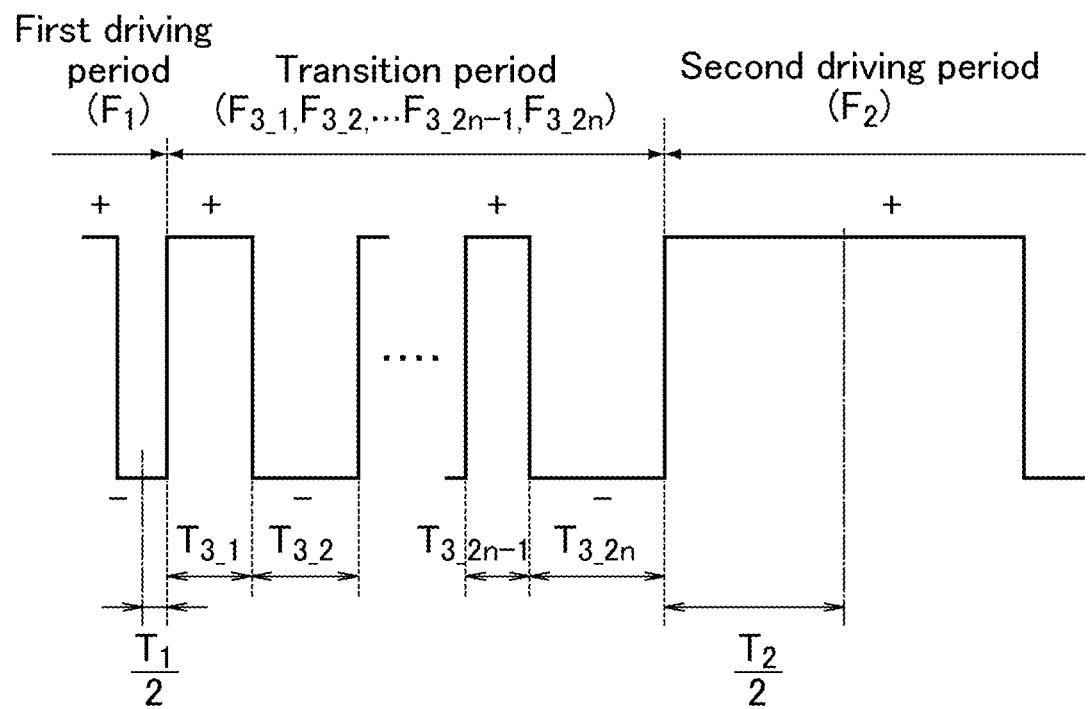
FIG. 13 is a schematic view of a waveform of an image signal for driving in Classification Example 2.

FIG. 13 is a schematic view of a waveform of an image signal for driving in Classification Example 2. FIG. 13 includes the first driving period (first frame frequency $F_1$ (unit: Hz), the length (time) $T_1$ (unit: second) of the frame period), the second driving period (second frame frequency $F_2$ (unit: Hz), the length (time) $T_2$ (unit: second) of the frame period), and the transition period (frame frequencies $F_{3\_1}$, $F_{3\_2}$, ..., $F_{3\_2n-1}$, and $F_{3\_2n}$ (unit: Hz), the lengths (time) $T_{3\_1}$, $T_{3\_2}$, ..., $T_{3\_2n-1}$, and $T_{3\_2n}$ (unit: second) of the frame periods) between the first driving period and the second driving period.

The frame frequencies preferably satisfy a relation represented by the following formula (2). In this case, Vcom shift is more suppressed when switching from the first frame frequency $F_1$ (first driving period) to the second frame frequency $F_2$ (second driving period). This results in better suppression of flickers.

[Math. 6]
$$0.4 \leq \frac{\sum_{1}^{n}\left(\frac{1}{F_{3\_2n}} - \frac{1}{F_{3\_2n-1}}\right)}{\frac{1}{F_2} - \frac{1}{F_1}} \leq 0.6 \qquad (2)$$

In the formula (2), n is an integer of 1 or greater.

The frame frequencies particularly preferably satisfy a relation represented by the following formula (2-1).

[Math. 7]
$$\frac{\sum_{1}^{n}\left(\frac{1}{F_{3\_2n}} - \frac{1}{F_{3\_2n-1}}\right)}{\frac{1}{F_2} - \frac{1}{F_1}} = 0.5 \qquad (2\text{-}1)$$

In the formula (2-1), n is an integer of 1 or greater.

CLASSIFICATION EXAMPLE 3

Classification Example 3 relates to the case where the number of frame periods in the transition period is an odd number of 3 or greater.

Figure 14:
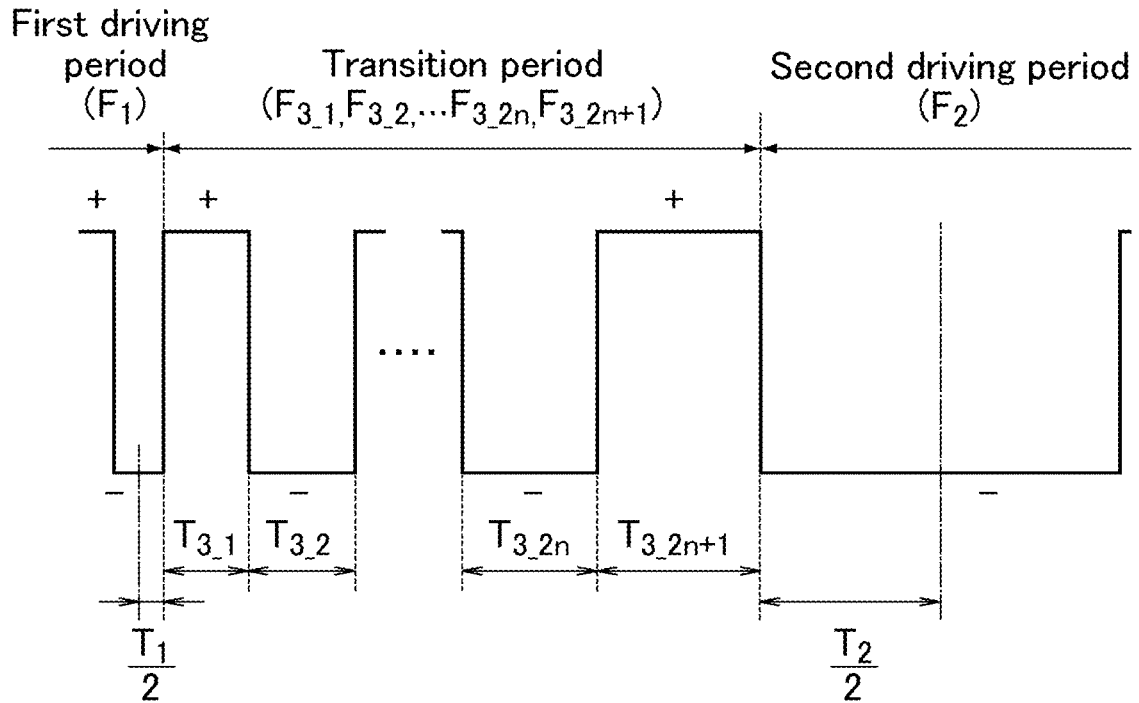
FIG. 14 is a schematic view of a waveform of an image signal for driving in Classification Example 3.

FIG. 14 is a schematic view of a waveform of an image signal for driving in Classification Example 3. FIG. 14 includes the first driving period (first frame frequency $F_1$ (unit: Hz), the length (time) $T_1$ (unit: second) of the frame period), the second driving period (second frame frequency $F_2$ (unit: Hz), the length (time) $T_2$ (unit: second) of the frame period), and the transition period (frame frequencies $F_{3\_1}$, $F_{3\_2}$, ..., $F_{3\_2n}$, and $F_{3\_2n+1}$ (unit: Hz), the lengths (time) $T_{3\_1}$, $T_{3\_2}$, ..., $T_{3\_2n}$, and $T_{3\_2n+1}$ (unit: second) of the frame periods) between the first driving period and the second driving period.

The frame frequencies preferably satisfy a relation represented by the following formula (3). In this case, Vcom shift is more suppressed when switching from the first frame frequency $F_1$ (first driving period) to the second frame frequency $F_2$ (second driving period). This results in better suppression of flickers.

[Math. 8]
$$0.4 \leq \frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} \leq 0.6 \qquad (3)$$

In the formula (3), n is an integer of 1 or greater.

The frame frequencies particularly preferably satisfy a relation represented by the following formula (3-1).

[Math. 9]
$$\frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} = 0.5 \qquad (3\text{-}1)$$

In the formula (3-1), n is an integer of 1 or greater.

The first frame frequency $F_1$ or the second frame frequency $F_2$, having a lower frame frequency, may have a frame frequency of 10 Hz or lower. In the case of driving without a transition period differently from the present embodiment, the influence of Vcom shift is greater when the lower of the first frame frequency $F_1$ and the second frame frequency $F_2$ is 10 Hz or lower. In contrast, in the present embodiment, even when the lower of the first frame frequency $F_1$ and the second frame frequency $F_2$ is 10 Hz or lower, Vcom shift is effectively suppressed.

The display device 1 is not limited and may be, for example, a display device which performs driving such as low-frequency driving and pause driving to achieve low power consumption and maintain display quality simultaneously and in which the voltage changes with time according to the balance of the RC time constants between the multiple materials. The display device 1 is preferably a liquid crystal display device.

When the display device 1 is a liquid crystal display device, the present embodiment can exert the effects thereof in a liquid crystal display device of any display mode (e.g., FFS mode, IPS mode, TN mode, and VA mode as shown in Structure Examples 1 to 4). Especially better effects are exerted in an FFS mode liquid crystal display device (Structure Example 1) and an IPS mode liquid crystal display device (Structure Example 3: a structure in which the pixel electrodes 13 and the common electrode 14 are not disposed in the same layer). In these devices, the balance of the RC time constants between the first alignment film 61, the second alignment film 63, the liquid crystal layer 62, and the first insulating film 66 (insulating film between the pixel electrodes 13 and the common electrode 14) is important. In a liquid crystal display device of such a display mode, a remarkable effect is exerted when the RC time constants are significantly different between the first alignment film 61, the second alignment film 63, the liquid crystal layer 62, and the first insulating film 66. In a liquid crystal display device of such a display mode, the first alignment film 61 and the second alignment film 63 each have a specific resistance of about $1\times10^{12}$ to $5\times10^{16}$ Ω·cm, the liquid crystal layer 62 has a specific resistance of about $1\times10^{11}$ to $1\times10^{16}$ Ω·cm, and the first insulating film 66 has a specific resistance of about $1\times10^{13}$ to $5\times10^{16}$ Ω·cm. A particularly remarkable effect is exerted when the first alignment film 61 and the second alignment film 63 each have a specific resistance of $1\times10^{15}$ Ω·cm or more and the liquid crystal layer 62 has a specific resistance of $1\times10^{14}$ Ω·cm or less. The effect may be exerted in any case of transmissive and reflective liquid crystal display devices.

EXAMPLES AND COMPARATIVE EXAMPLES

The present invention is described below in more detail based on examples and comparative examples. The examples, however, are not intended to limit the scope of the present invention.

A display device of each of the examples and comparative examples was assumed to be an FFS mode liquid crystal display device (Structure Example 1) as shown in FIG. 2 and FIG. 3, and simulation was performed for one pixel thereof. The conditions for the simulation were as follows.

(Alignment Film)

The first alignment film 61 and the second alignment film 63 each had a specific resistance of $1\times10^{15}$ Ω·cm, a dielectric constant of 3.9, and a thickness of 100 nm.

(Liquid Crystal Layer)

The liquid crystal layer 62 had a specific resistance of $1\times10^{13}$ Ω·cm, a dielectric constant of 6.0, and a thickness of 3.3 μm.

(Insulating Film)

The first insulating film 66 had a specific resistance of $1\times10^{15}$ Ω·cm, a dielectric constant of 6.5, and a thickness of 200 nm.

Examples 1 to 59 and Comparative Examples 1 to 12

An image signal for driving of the display device of each of the examples and comparative examples was made to have a configuration as shown in Tables 1 to 12. In each table, "polarity" indicates the polarity of a frame period where driving is performed at the corresponding frame frequency. In particular, "polarity <final>" indicates the polarity of the final frame period in the driving period, and "polarity <initial>" indicates the polarity of the first frame period in the driving period. The frame frequencies in the transition period are expressed as $F_{3\_1}, F_{3\_2} \ldots$ in the order from the first driving period side to the second driving period side.

Figure 15:
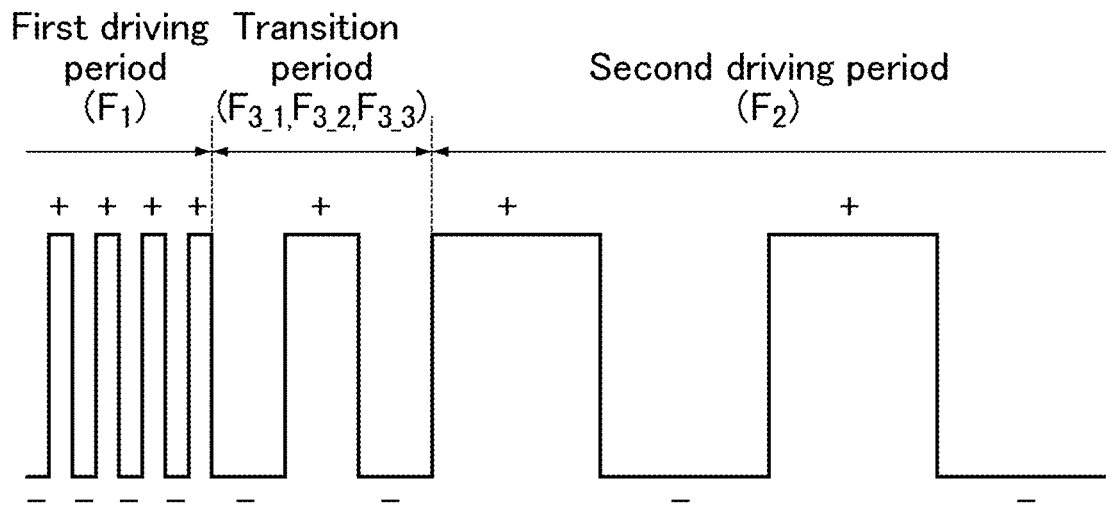
FIG. 15 is a schematic view of a waveform of an image signal for driving in a display device of Example 1.
Figure 16:
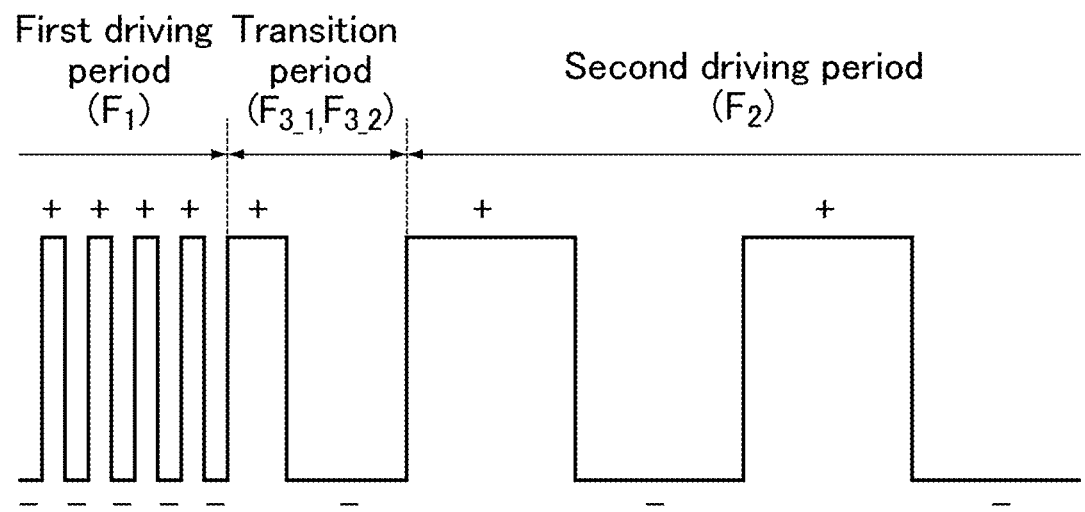
FIG. 16 is a schematic view of a waveform of an image signal for driving in a display device of Example 2.
Figure 17:
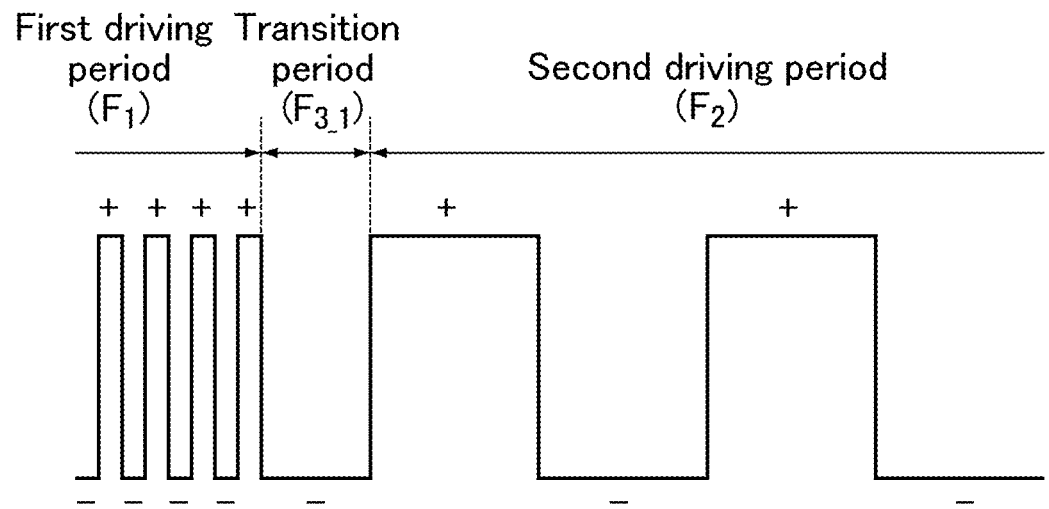
FIG. 17 is a schematic view of a waveform of an image signal for driving in a display device of Example 8.
Figure 18:
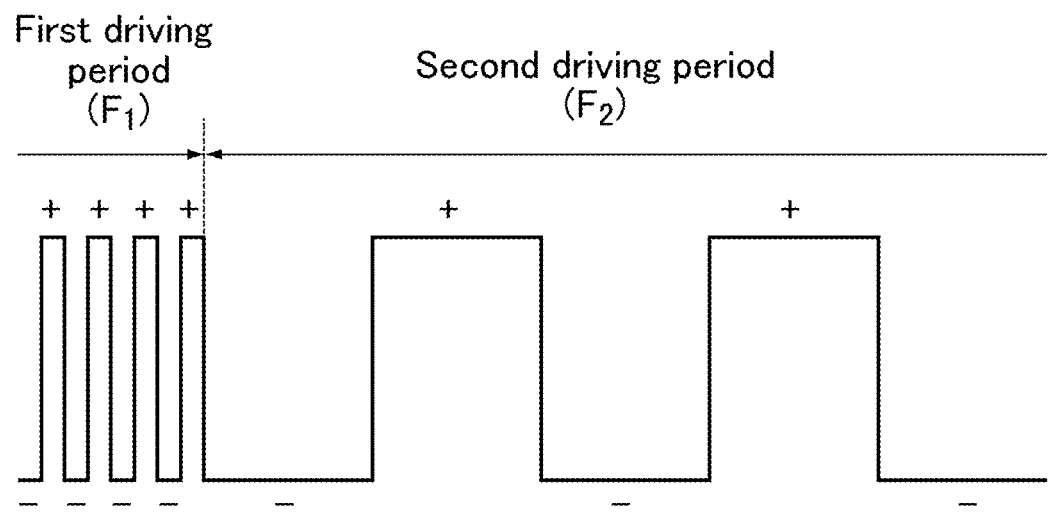
FIG. 18 is a schematic view of a waveform of an image signal for driving in a display device of Comparative Example 1.
Figure 19:
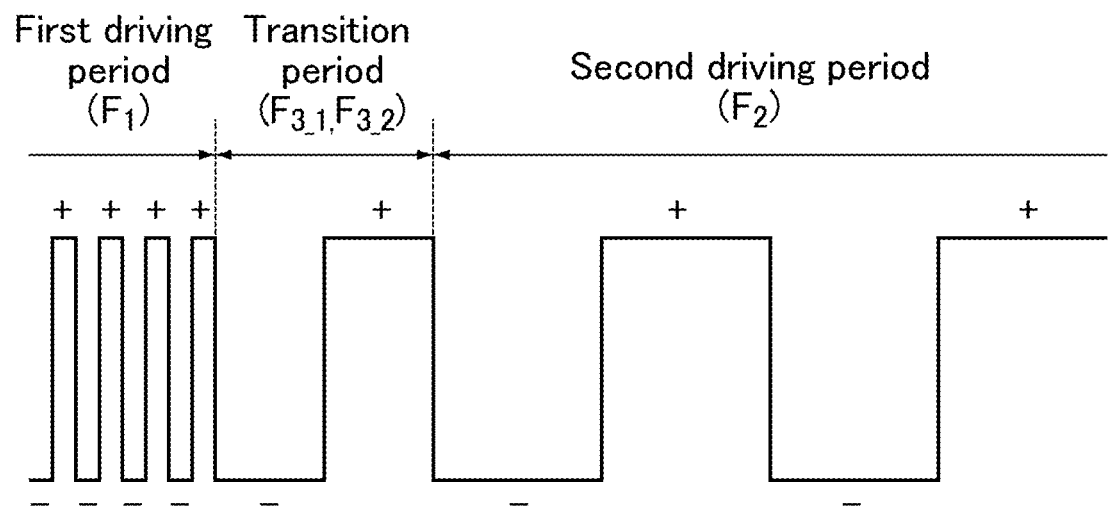
FIG. 19 is a schematic view of a waveform of an image signal for driving in a display device of Comparative Example 2.

Among Examples 1 to 59 and Comparative Examples 1 to 12, waveforms of an image signal for driving in Examples 1, 2, and 8, and Comparative Examples 1 and 2 are shown in FIGS. 15 to 19 as representative examples. FIG. 15 is a schematic view of a waveform of an image signal for driving in the display device of Example 1. FIG. 16 is a schematic view of a waveform of an image signal for driving in the display device of Example 2. FIG. 17 is a schematic view of a waveform of an image signal for driving in the display device of Example 8. FIG. 18 is a schematic view of a waveform of an image signal for driving in the display device of Comparative Example 1. FIG. 19 is a schematic view of a waveform of an image signal for driving in the display device of Comparative Example 2.

In Examples 1 to 59 and Comparative Examples 1 to 12, when the frame frequency was 60 Hz or higher, each frame period included refreshing period(s) only. Meanwhile, when the frame frequency is lower than 60 Hz, each frame period included refreshing period(s) and pause period(s). Additionally, in Examples 1 to 59, there was a difference between the polarity of the positive period or the negative period in the transition period, whichever had a longer total duration (e.g., in Example 1, negative period: the polarity was negative), and the polarity of a frame period that belonged to the first driving period or the second driving period, whichever had a lower frame frequency, and was closest to the transition period (e.g., in Example 1, the first frame period in the second driving period: the polarity was positive).

TABLE 1

|  |  | Example 1 | Example 2 | Example 3 | Example 4 | Example 5 | Example 6 |
|---|---|---|---|---|---|---|---|
| First driving period | $F_1$ (Hz) | 60 | 60 | 120 | 60 | 60 | 60 |
|  | Polarity <final> | Positive | Negative | Negative | Negative | Negative | Negative |

TABLE 1-continued

|  |  | Example 1 | Example 2 | Example 3 | Example 4 | Example 5 | Example 6 |
|---|---|---|---|---|---|---|---|
| Transition period | $F_{3\_1}$ (Hz) | 2 | 30 | 5 | 20 | 30 | 90 |
|  | Polarity | Negative | Positive | Positive | Positive | Positive | Positive |
|  | $F_{3\_2}$ (Hz) | 2 | 1 | 40 | 30 | 30 | 90 |
|  | Polarity | Positive | Negative | Negative | Negative | Negative | Negative |
|  | $F_{3\_3}$ (Hz) | 2 | — | 3 | 1 | 1 | 2 |
|  | Polarity | Negative | — | Positive | Positive | Positive | Positive |
|  | $F_{3\_4}$ (Hz) | — | — | — | — | — | — |
|  | Polarity | — | — | — | — | — | — |
|  | Total duration of positive period (sec) | 0.500 | 0.033 | 0.533 | 1.050 | 1.033 | 0.511 |
|  | Total duration of negative period (sec) | 1.000 | 1.000 | 0.025 | 0.033 | 0.033 | 0.011 |
| Second driving period | $F_2$ (Hz) | 1 | 0.5 | 1 | 0.5 | 0.5 | 1 |
|  | Polarity <initial> | Positive | Positive | Negative | Negative | Negative | Negative |

TABLE 2

|  |  | Example 7 | Example 8 | Example 9 | Example 10 | Example 11 | Example 12 |
|---|---|---|---|---|---|---|---|
| First driving period | $F_1$ (Hz) | 2 | 60 | 60 | 60 | 60 | 60 |
|  | Polarity <final> | Positive | Positive | Negative | Negative | Negative | Negative |
| Transition period | $F_{3\_1}$ (Hz) | 5 | 2 | 9.8 | 4.9 | 3.3 | 2.5 |
|  | Polarity | Negative | Negative | Positive | Positive | Positive | Positive |
|  | $F_{3\_2}$ (Hz) | 10 | — | — | — | — | — |
|  | Polarity | Positive | — | — | — | — | — |
|  | $F_{3\_3}$ (Hz) | 6 | — | — | — | — | — |
|  | Polarity | Negative | — | — | — | — | — |
|  | $F_{3\_4}$ (Hz) | — | — | — | — | — | — |
|  | Polarity | — | — | — | — | — | — |
|  | Total duration of positive period (sec) | 0.100 | 0 | 0.102 | 0.204 | 0.303 | 0.400 |
|  | Total duration of negative period (sec) | 0.367 | 0.500 | 0 | 0 | 0 | 0 |
| Second driving period | $F_2$ (Hz) | 30 | 1 | 1 | 1 | 1 | 1 |
|  | Polarity <initial> | Positive | Positive | Negative | Negative | Negative | Negative |

TABLE 3

|  |  | Example 13 | Example 14 | Example 15 | Example 16 | Example 17 | Example 18 |
|---|---|---|---|---|---|---|---|
| First driving period | $F_1$ (Hz) | 60 | 60 | 60 | 60 | 60 | 10 |
|  | Polarity <final> | Negative | Negative | Negative | Negative | Negative | Negative |
| Transition period | $F_{3\_1}$ (Hz) | 2 | 1.6 | 1.4 | 1.2 | 1.1 | 4.55 |
|  | Polarity | Positive | Positive | Positive | Positive | Positive | Positive |
|  | $F_{3\_2}$ (Hz) | — | — | — | — | — | — |
|  | Polarity | — | — | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0.500 | 0.625 | 0.714 | 0.833 | 0.909 | 0.220 |
|  | Total duration of negative period (sec) | 0 | 0 | 0 | 0 | 0 | 0 |
| Second driving period | $F_2$ (Hz) | 1 | 1 | 1 | 1 | 1 | 1 |
|  | Polarity <initial> | Negative | Negative | Negative | Negative | Negative | Negative |

TABLE 4

|  |  | Example 19 | Example 20 | Example 21 | Example 22 | Example 23 | Example 24 |
|---|---|---|---|---|---|---|---|
| First driving period | $F_1$ (Hz) | 10 | 10 | 10 | 10 | 10 | 10 |
|  | Polarity <final> | Negative | Negative | Negative | Negative | Negative | Negative |
| Transition period | $F_{3\_1}$ (Hz) | 3.03 | 2.27 | 1.82 | 1.52 | 1.3 | 1.14 |
|  | Polarity | Positive | Positive | Positive | Positive | Positive | Positive |

TABLE 4-continued

|  |  | Example 19 | Example 20 | Example 21 | Example 22 | Example 23 | Example 24 |
|---|---|---|---|---|---|---|---|
|  | $F_{3\_2}$ (Hz) | — | — | — | — | — | — |
|  | Polarity | — | — | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0.330 | 0.441 | 0.549 | 0.658 | 0.769 | 0.877 |
|  | Total duration of negative period (sec) | 0 | 0 | 0 | 0 | 0 | 0 |
| Second driving period | $F_2$ (Hz) | 1 | 1 | 1 | 1 | 1 | 1 |
|  | Polarity <initial> | Negative | Negative | Negative | Negative | Negative | Negative |

TABLE 5

|  |  | Example 25 | Example 26 | Example 27 | Example 28 | Example 29 | Example 30 |
|---|---|---|---|---|---|---|---|
| First driving period | $F_1$ (Hz) | 4 | 4 | 4 | 4 | 4 | 2 |
|  | Polarity <final> | Negative | Negative | Negative | Negative | Negative | Negative |
| Transition period | $F_{3\_1}$ (Hz) | 2.67 | 2 | 1.6 | 1.34 | 1.14 | 1.9 |
|  | Polarity | Positive | Positive | Positive | Positive | Positive | Positive |
|  | $F_{3\_2}$ (Hz) | — | — | — | — | — | — |
|  | Polarity | — | — | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0.375 | 0.500 | 0.625 | 0.746 | 0.877 | 0.526 |
|  | Total duration of negative period (sec) | 0 | 0 | 0 | 0 | 0 | 0 |
| Second driving period | $F_2$ (Hz) | 1 | 1 | 1 | 1 | 1 | 1 |
|  | Polarity <initial> | Negative | Negative | Negative | Negative | Negative | Negative |

TABLE 6

|  |  | Example 31 | Example 32 | Example 33 | Example 34 | Example 35 | Example 36 |
|---|---|---|---|---|---|---|---|
| First driving period | $F_1$ (Hz) | 2 | 2 | 2 | 2 | 2 | 2 |
|  | Polarity <final> | Negative | Negative | Negative | Negative | Negative | Negative |
| Transition period | $F_{3\_1}$ (Hz) | 1.67 | 1.48 | 1.33 | 1.21 | 1.11 | 1.03 |
|  | Polarity | Positive | Positive | Positive | Positive | Positive | Positive |
|  | $F_{3\_2}$ (Hz) | — | — | — | — | — | — |
|  | Polarity | — | — | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0.599 | 0.676 | 0.752 | 0.826 | 0.901 | 0.971 |
|  | Total duration of negative period (sec) | 0 | 0 | 0 | 0 | 0 | 0 |
| Second driving period | $F_2$ (Hz) | 1 | 1 | 1 | 1 | 1 | 1 |
|  | Polarity <initial> | Negative | Negative | Negative | Negative | Negative | Negative |

TABLE 7

|  |  | Example 37 | Example 38 | Example 39 | Example 40 | Example 41 | Example 42 |
|---|---|---|---|---|---|---|---|
| First driving period | $F_1$ (Hz) | 60 | 60 | 60 | 60 | 60 | 60 |
|  | Polarity <final> | Negative | Negative | Negative | Negative | Negative | Negative |
| Transition period | $F_{3\_1}$ (Hz) | 20 | 20 | 20 | 20 | 20 | 20 |
|  | Polarity | Positive | Positive | Positive | Positive | Positive | Positive |
|  | $F_{3\_2}$ (Hz) | 4 | 2.9 | 2.25 | 1.87 | 1.57 | 1.35 |
|  | Polarity | Negative | Negative | Negative | Negative | Negative | Negative |

TABLE 7-continued

|  |  | Example 37 | Example 38 | Example 39 | Example 40 | Example 41 | Example 42 |
|---|---|---|---|---|---|---|---|
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0.050 | 0.050 | 0.050 | 0.050 | 0.050 | 0.050 |
|  | Total duration of negative period (sec) | 0.250 | 0.345 | 0.444 | 0.535 | 0.637 | 0.741 |
| Second driving period | $F_2$ (Hz) | 1 | 1 | 1 | 1 | 1 | 1 |
|  | Polarity <initial> | Positive | Positive | Positive | Positive | Positive | Positive |

TABLE 8

|  |  | Example 43 | Example 44 | Example 45 | Example 46 | Example 47 | Example 48 |
|---|---|---|---|---|---|---|---|
| First driving period | $F_1$ (Hz) | 60 | 60 | 60 | 60 | 60 | 60 |
|  | Polarity <final> | Negative | Negative | Negative | Negative | Negative | Negative |
| Transition period | $F_{3\_1}$ (Hz) | 20 | 10 | 10 | 45 | 30 | 30 |
|  | Polarity | Positive | Positive | Positive | Positive | Positive | Positive |
|  | $F_{3\_2}$ (Hz) | 1.2 | 2 | 1.71 | 30 | 40 | 40 |
|  | Polarity | Negative | Negative | Negative | Negative | Negative | Negative |
|  | $F_{3\_3}$ (Hz) | — | — | — | 90 | 5 | 3.4 |
|  | Polarity | — | — | — | Positive | Positive | Positive |
|  | $F_{3\_4}$ (Hz) | — | — | — | 1 | — | — |
|  | Polarity | — | — | — | Negative | — | — |
|  | Total duration of positive period (sec) | 0.050 | 0.100 | 0.100 | 0.033 | 0.233 | 0.327 |
|  | Total duration of negative period (sec) | 0.833 | 0.500 | 0.585 | 1.033 | 0.025 | 0.025 |
| Second driving period | $F_2$ (Hz) | 1 | 1 | 1 | 0.5 | 1 | 1 |
|  | Polarity <initial> | Positive | Positive | Positive | Positive | Negative | Negative |

TABLE 9

|  |  | Example 49 | Example 50 | Example 51 | Example 52 | Example 53 | Example 54 |
|---|---|---|---|---|---|---|---|
| First driving period | $F_1$ (Hz) | 60 | 60 | 60 | 60 | 60 | 60 |
|  | Polarity <final> | Negative | Negative | Negative | Negative | Negative | Negative |
| Transition period | $F_{3\_1}$ (Hz) | 30 | 30 | 30 | 30 | 40 | 24 |
|  | Polarity | Positive | Positive | Positive | Positive | Positive | Positive |
|  | $F_{3\_2}$ (Hz) | 40 | 40 | 40 | 40 | — | — |
|  | Polarity | Negative | Negative | Negative | Negative | — | — |
|  | $F_{3\_3}$ (Hz) | 2.5 | 2 | 1.67 | 1.42 | — | — |
|  | Polarity | Positive | Positive | Positive | Positive | — | — |
|  | $F_{3\_4}$ (Hz) | — | — | — | — | — | — |
|  | Polarity | — | — | — | — | — | — |
|  | Total duration of positive period (sec) | 0.433 | 0.533 | 0.632 | 0.738 | 0.025 | 0.042 |
|  | Total duration of negative period (sec) | 0.025 | 0.025 | 0.025 | 0.025 | 0 | 0 |
| Second driving period | $F_2$ (Hz) | 1 | 1 | 1 | 1 | 30 | 15 |
|  | Polarity <initial> | Negative | Negative | Negative | Negative | Negative | Negative |

TABLE 10

|  |  | Example 55 | Example 56 | Example 57 | Example 58 | Example 59 |
|---|---|---|---|---|---|---|
| First driving period | $F_1$ (Hz) | 60 | 60 | 60 | 60 | 60 |
|  | Polarity <final> | Negative | Negative | Negative | Negative | Negative |
| Transition period | $F_{3\_1}$ (Hz) | 17 | 9.2 | 7.5 | 5.7 | 3.9 |
|  | Polarity | Positive | Positive | Positive | Positive | Positive |
|  | $F_{3\_2}$ (Hz) | — | — | — | — | — |
|  | Polarity | — | — | — | — | — |
|  | $F_{3\_3}$ (Hz) | — | — | — | — | — |
|  | Polarity | — | — | — | — | — |

TABLE 10-continued

|  |  | Example 55 | Example 56 | Example 57 | Example 58 | Example 59 |
|---|---|---|---|---|---|---|
|  | $F_{3\_4}$ (Hz) | — | — | — | — | — |
|  | Polarity | — | — | — | — | — |
|  | Total duration of positive period (sec) | 0.059 | 0.109 | 0.133 | 0.175 | 0.256 |
|  | Total duration of negative period (sec) | 0 | 0 | 0 | 0 | 0 |
| Second driving period | $F_2$ (Hz) | 10 | 5 | 4 | 3 | 2 |
|  | Polarity <initial> | Negative | Negative | Negative | Negative | Negative |

TABLE 11

|  |  | Comparative Example 1 | Comparative Example 2 | Comparative Example 3 | Comparative Example 4 | Comparative Example 5 | Comparative Example 6 |
|---|---|---|---|---|---|---|---|
| First driving period | $F_1$ (Hz) | 60 | 60 | 10 | 4 | 2 | 60 |
|  | Polarity <final> | Positive | Positive | Positive | Positive | Positive | Positive |
| Transition period | $F_{3\_1}$ (Hz) | — | 2 | — | — | — | — |
|  | Polarity | — | Negative | — | — | — | — |
|  | $F_{3\_2}$ (Hz) | — | 2 | — | — | — | — |
|  | Polarity | — | Positive | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0 | 0.500 | 0 | 0 | 0 | 0 |
|  | Total duration of negative period (sec) | 0 | 0.500 | 0 | 0 | 0 | 0 |
| Second driving period | $F_2$ (Hz) | 1 | 1 | 1 | 1 | 1 | 30 |
|  | Polarity <initial> | Negative | Negative | Negative | Negative | Negative | Negative |

TABLE 12

|  |  | Comparative Example 7 | Comparative Example 8 | Comparative Example 9 | Comparative Example 10 | Comparative Example 11 | Comparative Example 12 |
|---|---|---|---|---|---|---|---|
| First driving period | $F_1$ (Hz) | 60 | 60 | 60 | 60 | 60 | 60 |
|  | Polarity <final> | Positive | Positive | Positive | Positive | Positive | Positive |
| Transition period | $F_{3\_1}$ (Hz) | — | — | — | — | — | — |
|  | Polarity | — | — | — | — | — | — |
|  | $F_{3\_2}$ (Hz) | — | — | — | — | — | — |
|  | Polarity | — | — | — | — | — | — |
|  | $F_{3\_3}$ (Hz) | — | — | — | — | — | — |
|  | Polarity | — | — | — | — | — | — |
|  | $F_{3\_4}$ (Hz) | — | — | — | — | — | — |
|  | Polarity | — | — | — | — | — | — |
|  | Total duration of positive period (sec) | 0 | 0 | 0 | 0 | 0 | 0 |
|  | Total duration of negative period (sec) | 0 | 0 | 0 | 0 | 0 | 0 |
| Second driving period | $F_2$ (Hz) | 15 | 10 | 5 | 4 | 3 | 2 |
|  | Polarity <initial> | Negative | Negative | Negative | Negative | Negative | Negative |

[Evaluation 1]

Figure 20:
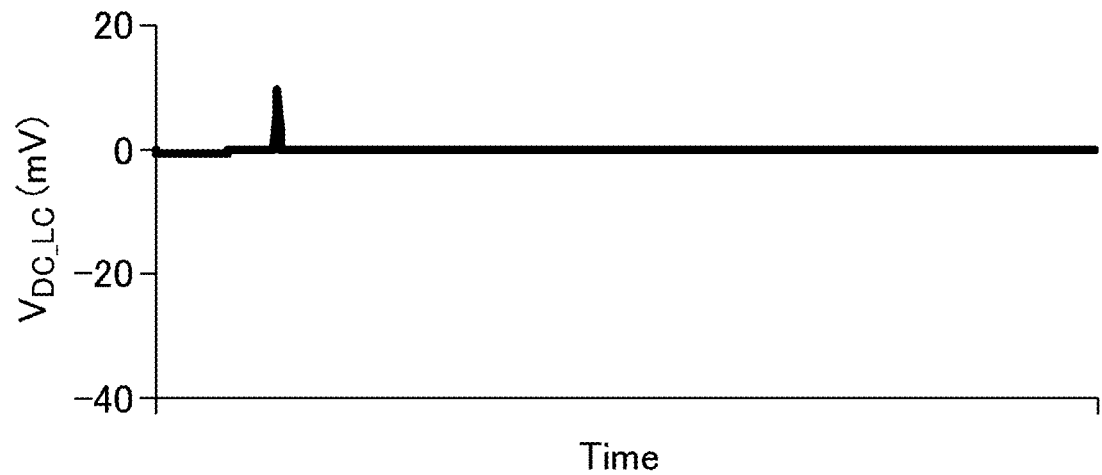
FIG. 20 is a graph showing the results of simulation for the display device of Example 1.
Figure 21:
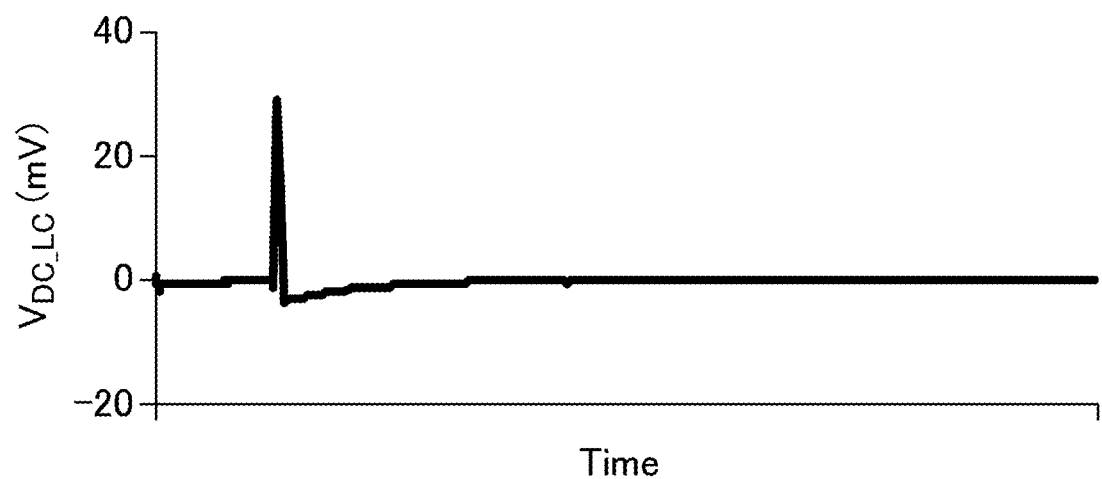
FIG. 21 is a graph showing the results of simulation for the display device of Example 2.
Figure 22:
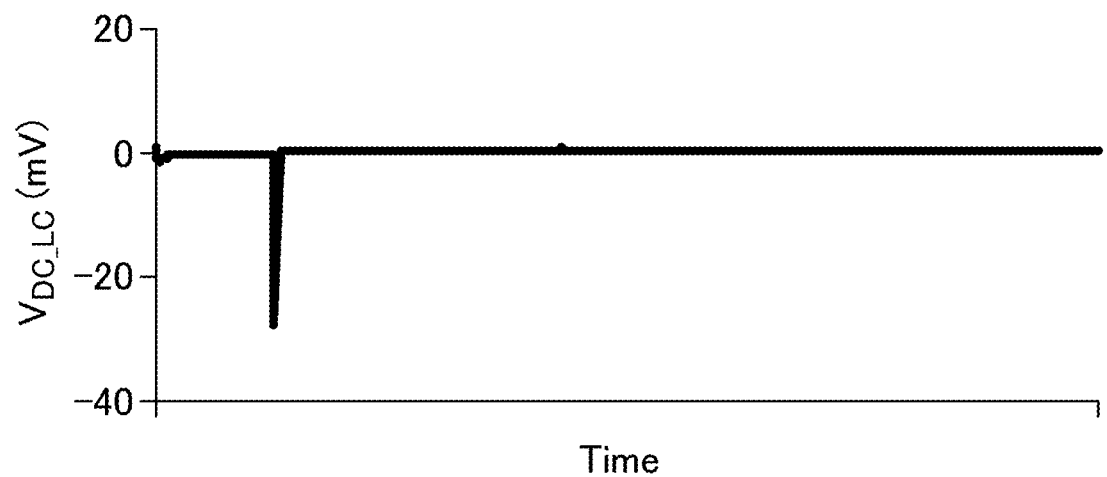
FIG. 22 is a graph showing the results of simulation for a display device of Example 3.
Figure 23:
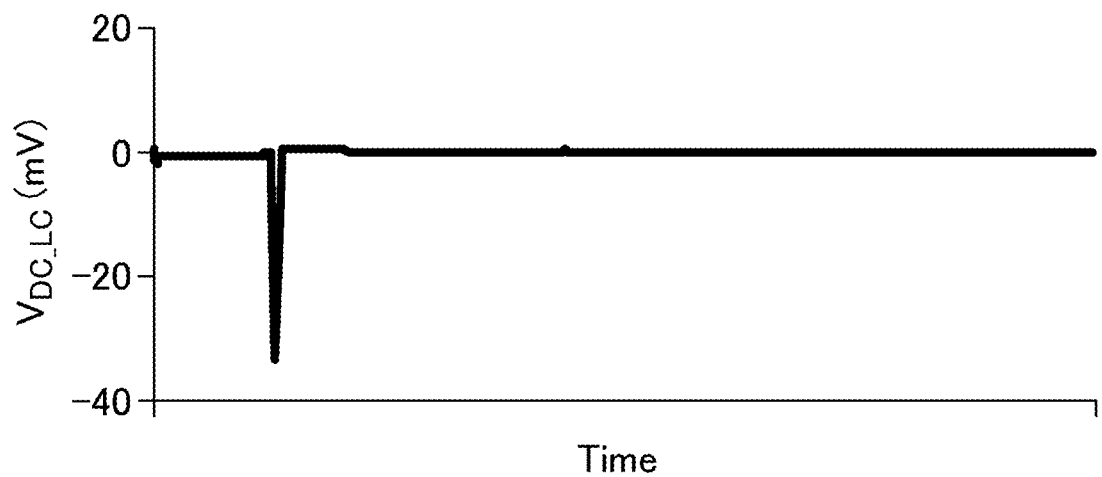
FIG. 23 is a graph showing the results of simulation for a display device of Example 4.
Figure 24:
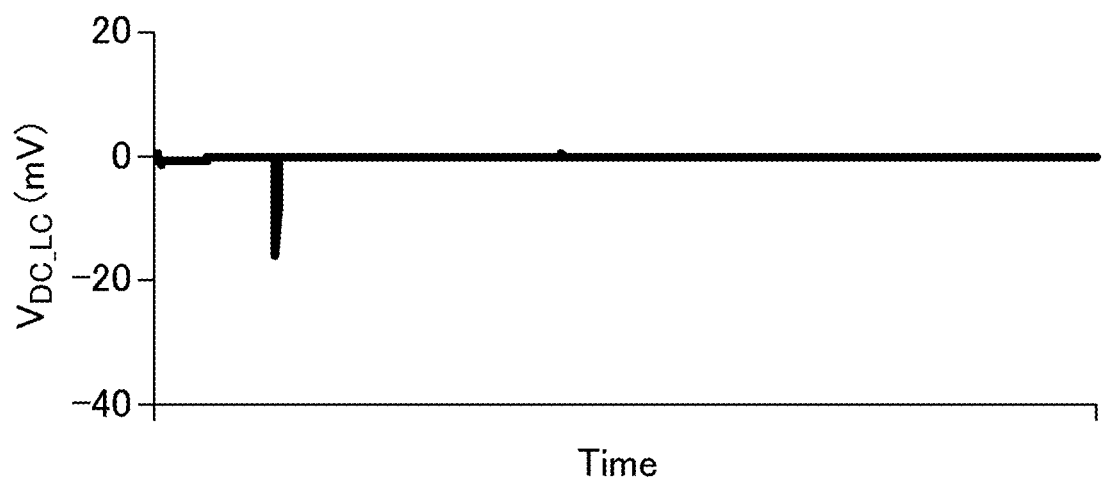
FIG. 24 is a graph showing the results of simulation for a display device of Example 5.
Figure 25:
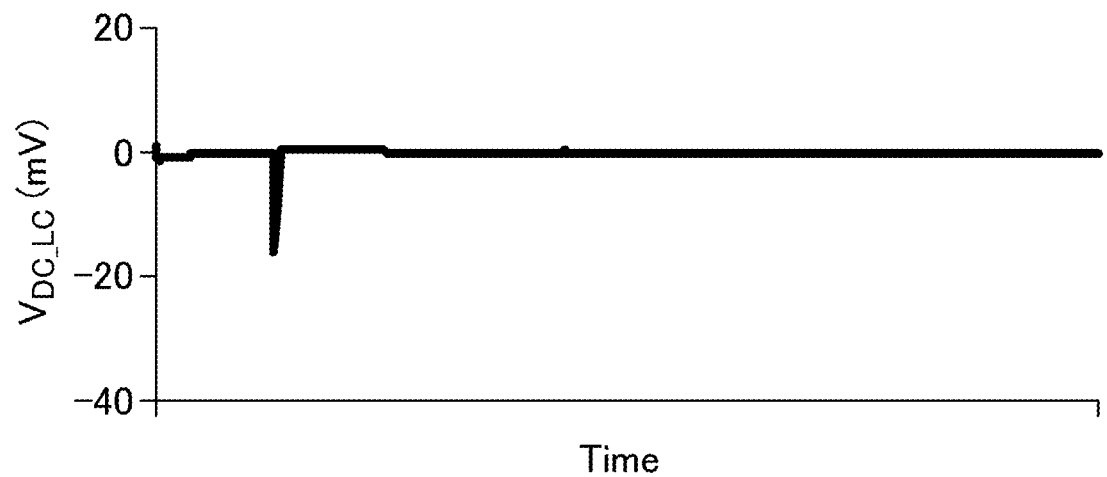
FIG. 25 is a graph showing the results of simulation for a display device of Example 6.
Figure 26:
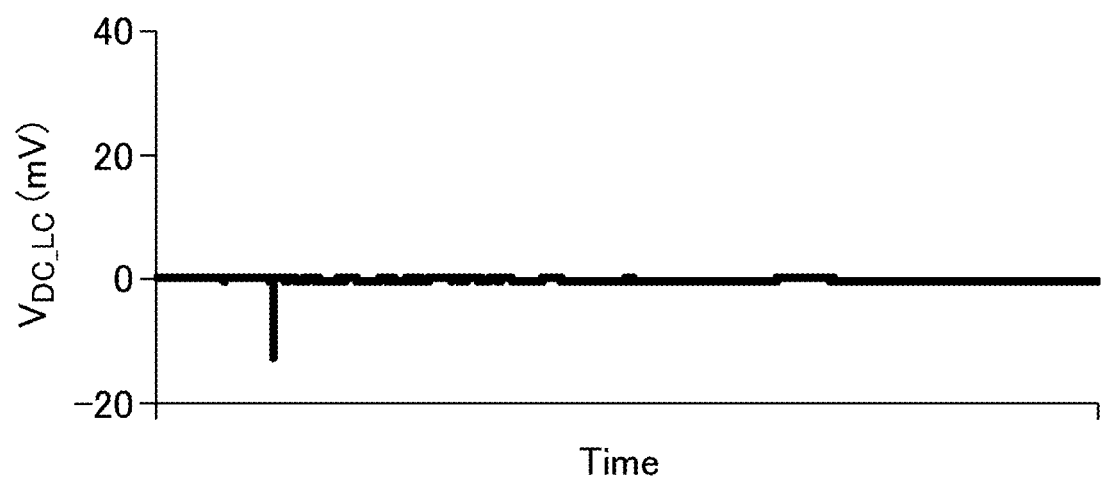
FIG. 26 is a graph showing the results of simulation for a display device of Example 7.
Figure 27:
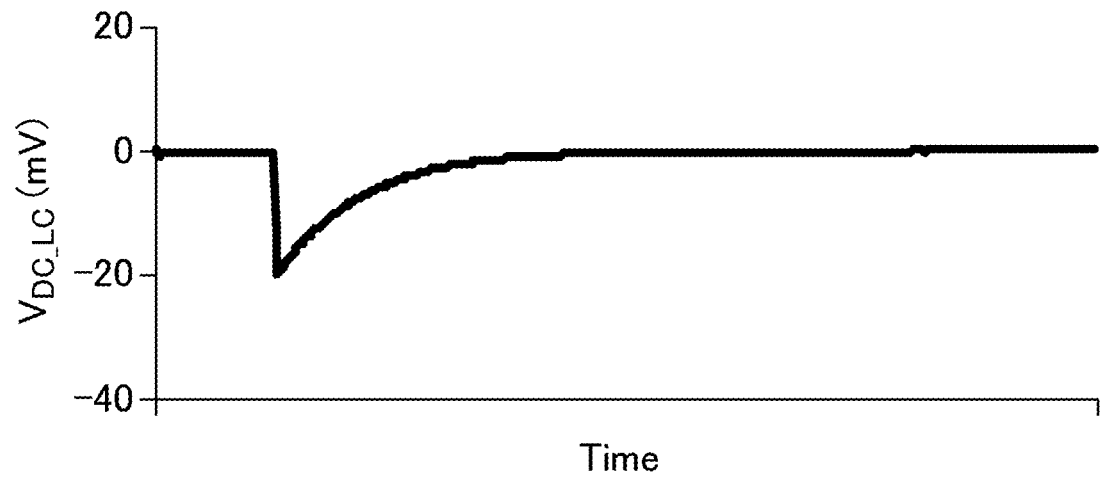
FIG. 27 is a graph showing the results of simulation for the display device of Comparative Example 1.
Figure 28:
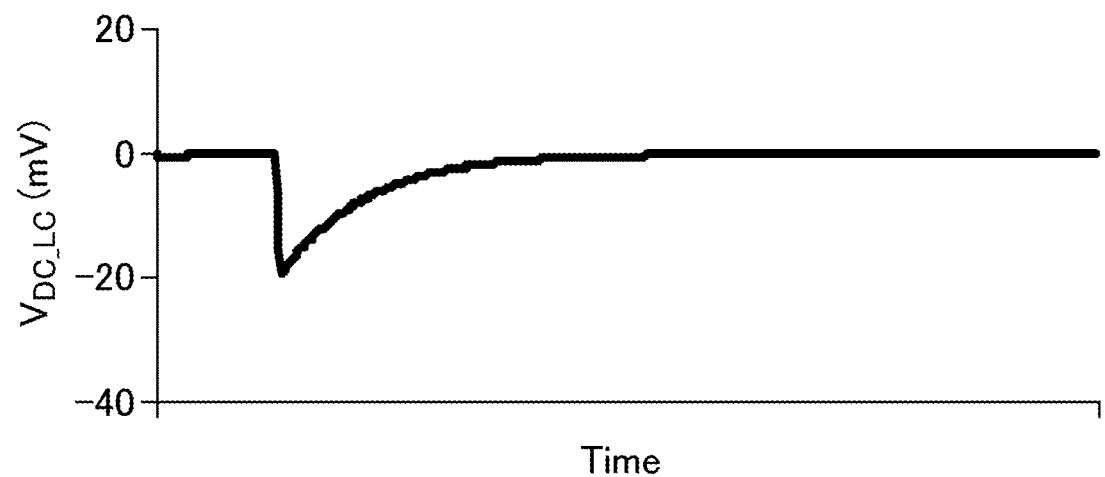
FIG. 28 is a graph showing the results of simulation for the display device of Comparative Example 2.

In the display device of each of Examples 1 to 7 and Comparative Examples 1 and 2, the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. FIGS. 20 to 28 show the simulation results. FIG. 20 is a graph showing the results of simulation for the display device of Example 1. FIG. 21 is a graph showing the results of simulation for the display device of Example 2. FIG. 22 is a graph showing the results of simulation for the display device of Example 3. FIG. 23 is a graph showing the results of simulation for the display device of Example 4. FIG. 24 is a graph showing the results of simulation for the display device of Example 5. FIG. 25 is a graph showing the results of simulation for the display device of Example 6. FIG. 26 is a graph showing the results of simulation for the display device of Example 7. FIG. 27 is a graph showing the results of simulation for the display device of Comparative Example 1. FIG. 28 is a graph showing the results of simulation for the display device of Comparative Example 2.

As shown in FIGS. 20 to 26, in Examples 1 to 7, variation in DC voltage component $V_{DC\_LC}$ applied to the liquid crystal layer was suppressed (the variation period was short)

when changing the frame frequency. The suppression of Vcom shift resulted in suppression of flickers. In FIGS. 20 to 26, the DC voltage component $V_{DC\_LC}$ applied to the liquid crystal layer seems to momently vary when changing the frame frequency. This is because, according to the definition shown in FIG. 11, the DC voltage component $V_{DC\_LC}$ applied to the liquid crystal layer always varies before and after changing the frame frequency. This momentary variation thus caused no problem for display.

Meanwhile, as shown in FIGS. 27 and 28, in Comparative Examples 1 and 2, the DC voltage component $V_{DC\_LC}$ applied to the liquid crystal layer significantly varied (the variation period was long) when changing the frame frequency. Occurrence of Vcom shift resulted in increased flickers. The reason for this is that, in Comparative Example 1, no transition period was provided between the first driving period and the second driving period, and that, in Comparative Example 2, the total duration of the positive period and the total duration of the negative period in the transition period were the same as each other.

[Evaluation 2]

Figure 29:
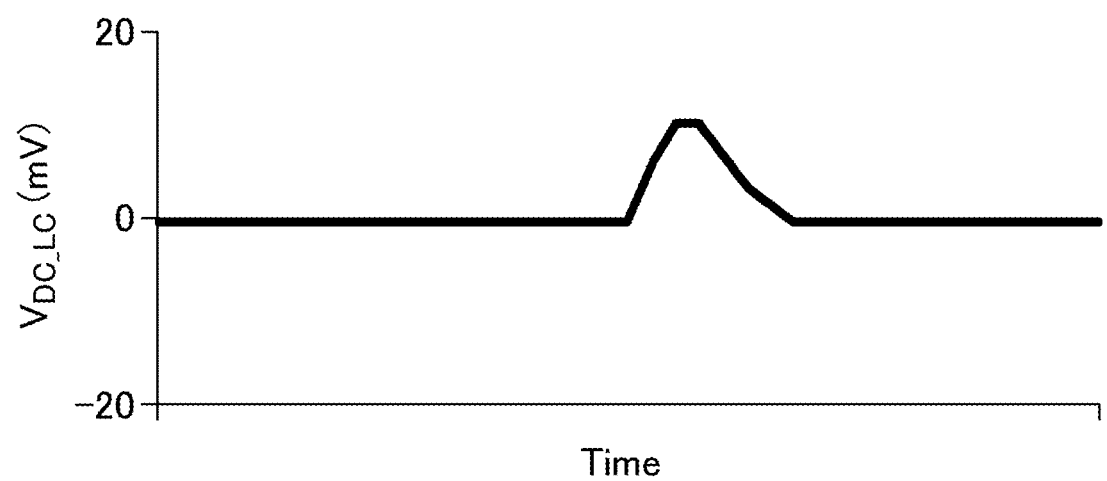
FIG. 29 is an enlarged graph showing a part around the transition period of the graph showing the results of simulation for the display device of Example 1.
Figure 30:
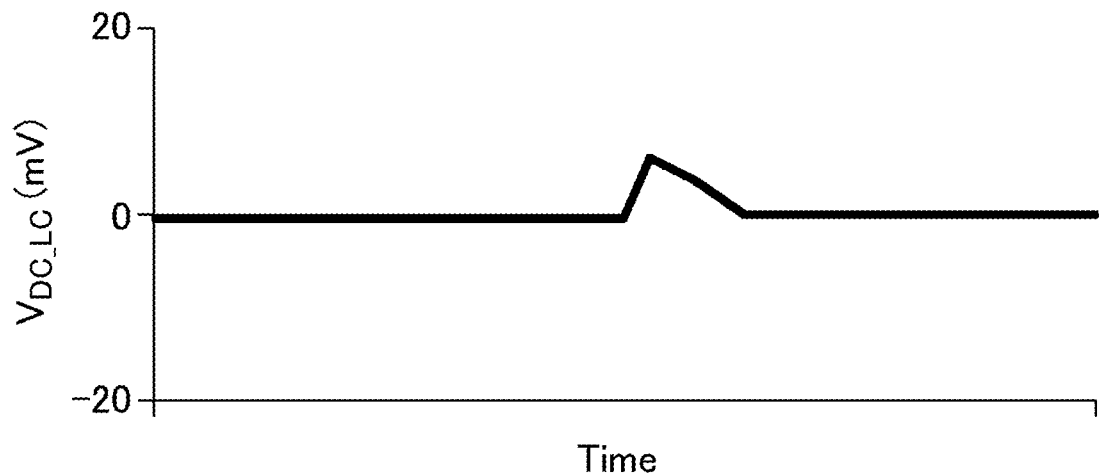
FIG. 30 is an enlarged graph showing a part around the transition period of the graph showing the results of simulation for the display device of Example 8.

In the display device of each of Examples 1 and 8, the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. FIGS. 29 and 30 show the simulation results. FIG. 29 is an enlarged graph showing a part around the transition period of the graph showing the results of simulation for the display device of Example 1. FIG. 30 is an enlarged graph showing a part around the transition period of the graph showing the results of simulation for the display device of Example 8. In Examples 1 and 8, the structure of the image signal for driving was the same as each other except for the number of frame periods in the transition period (Example 1: 3, Example 8: 1).

As shown in FIGS. 29 and 30, in Example 8, the variation in DC voltage component $V_{DC\_LC}$ applied to the liquid crystal layer when changing the frame frequency was more suppressed as compared with Example 1. This shows that the variation is more effectively suppressed when the number of frame periods in the transition period is 1.

[Evaluation 3]

Evaluation was made for preferred relations of the frame frequencies between the first driving period, the second driving period, and the transition period in the case where the number of frame periods in the transition period was 1 (Classification Example 1).

(Evaluation 3-1)

In the display device of each of Examples 9 to 17 and Comparative Example 1, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 13 shows the simulation results. In Table 13, X indicates values calculated from the following formula (x) (the same shall apply to the other tables). The variation amount ($|\Delta V_{DC\_LC}|$) of the DC voltage component $V_{DC\_LC}$ applied to the liquid crystal layer was calculated excepting the momentary variation of the DC voltage component $V_{DC\_LC}$ applied to the liquid crystal layer in the part where the frame frequencies were switched (the same shall apply to the other simulations).

[Math. 10]

$$X = \frac{F_1 F_2}{F_{3\_1}(F_1 + F_2)} \quad (x)$$

TABLE 13

|  | $F_1$ (Hz) | $F_{3\_1}$ (Hz) | $F_2$ (Hz) | X | $|\Delta V_{DC\_LC}|$ (mV) |
| --- | --- | --- | --- | --- | --- |
| Example 9 | 60 | 9.8 | 1 | 0.1 | 41 |
| Example 10 | 60 | 4.9 | 1 | 0.2 | 31 |
| Example 11 | 60 | 3.3 | 1 | 0.3 | 21 |
| Example 12 | 60 | 2.5 | 1 | 0.4 | 11 |
| Example 13 | 60 | 2 | 1 | 0.5 | 0 |
| Example 14 | 60 | 1.6 | 1 | 0.6 | 10 |
| Example 15 | 60 | 1.4 | 1 | 0.7 | 20 |
| Example 16 | 60 | 1.2 | 1 | 0.8 | 30 |
| Example 17 | 60 | 1.1 | 1 | 0.9 | 39 |
| Comparative Example 1 | 60 | — | 1 | — | 50 |

As shown in Table 13, in Examples 9 to 17, the variation amount ($|\Delta V_{DC\_LC}|$) of the DC voltage component $V_{DC\_LC}$ applied to the liquid crystal layer when changing the frame frequency was small and the Vcom shift was suppressed as compared with Comparative Example 1. In particular, Vcom shift was more suppressed in Examples 12 to 14.

(Evaluation 3-2)

In the display device of each of Examples 18 to 24 and Comparative Example 3, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 14 shows the simulation results.

TABLE 14

|  | $F_1$ (Hz) | $F_{3\_1}$ (Hz) | $F_2$ (Hz) | X | $|\Delta V_{DC\_LC}|$ (mV) |
| --- | --- | --- | --- | --- | --- |
| Example 18 | 10 | 4.55 | 1 | 0.2 | 33 |
| Example 19 | 10 | 3.03 | 1 | 0.3 | 22 |
| Example 20 | 10 | 2.27 | 1 | 0.4 | 11 |
| Example 21 | 10 | 1.82 | 1 | 0.5 | 0 |
| Example 22 | 10 | 1.52 | 1 | 0.6 | 11 |
| Example 23 | 10 | 1.3 | 1 | 0.7 | 22 |
| Example 24 | 10 | 1.14 | 1 | 0.8 | 32 |
| Comparative Example 3 | 10 | — | 1 | — | 45 |

As shown in Table 14, in Examples 18 to 24, the variation amount ($|\Delta V_{DC\_LC}|$) of the DC voltage component $V_{DC\_LC}$ applied to the liquid crystal layer when changing the frame frequency was small and Vcom shift was suppressed as compared with Comparative Example 3. In particular, Vcom shift was more suppressed in Examples 20 to 22.

(Evaluation 3-3)

In the display device of each of Examples 25 to 29 and Comparative Example 4, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 15 shows the simulation results.

TABLE 15

|  | $F_1$ (Hz) | $F_{3\_1}$ (Hz) | $F_2$ (Hz) | X | $|\Delta V_{DC\_LC}|$ (mV) |
|---|---|---|---|---|---|
| Example 25 | 4 | 2.67 | 1 | 0.3 | 25 |
| Example 26 | 4 | 2 | 1 | 0.4 | 13 |
| Example 27 | 4 | 1.6 | 1 | 0.5 | 0 |
| Example 28 | 4 | 1.34 | 1 | 0.6 | 12 |
| Example 29 | 4 | 1.14 | 1 | 0.7 | 24 |
| Comparative Example 4 | 4 | — | 1 | — | 38 |

As shown in Table 15, in Examples 25 to 29, the variation amount ($|\Delta V_{DC\_LC}|$) of the DC voltage component $V_{DC\_LC}$ applied to the liquid crystal layer when changing the frame frequency was small and Vcom shift was suppressed as compared with Comparative Example 4. In particular, Vcom shift was more suppressed in Examples 26 to 28.

(Evaluation 3-4)

In the display device of each of Examples 30 to 36 and Comparative Example 5, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 16 shows the simulation results.

TABLE 16

|  | $F_1$ (Hz) | $F_{3\_1}$ (Hz) | $F_2$ (Hz) | X | $|\Delta V_{DC\_LC}|$ (mV) |
|---|---|---|---|---|---|
| Example 30 | 2 | 1.9 | 1 | 0.35 | 23 |
| Example 31 | 2 | 1.67 | 1 | 0.40 | 15 |
| Example 32 | 2 | 1.48 | 1 | 0.45 | 8 |
| Example 33 | 2 | 1.33 | 1 | 0.50 | 0 |
| Example 34 | 2 | 1.21 | 1 | 0.55 | 7 |
| Example 35 | 2 | 1.11 | 1 | 0.60 | 15 |
| Example 36 | 2 | 1.03 | 1 | 0.65 | 22 |
| Comparative Example 5 | 2 | — | 1 | — | 25 |

As shown in Table 16, in Examples 30 to 36, the variation amount ($|\Delta V_{DC\_LC}|$) of the DC voltage component $V_{DC\_LC}$ applied to the liquid crystal layer when switching the frame frequencies was small and Vcom shift was suppressed as compared with Comparative Example 5. In particular, Vcom shift was more suppressed in Examples 31 to 35.

The results of Evaluations 3-1 to 3-4 (Tables 13 to 16) show that Vcom shift when changing the frame frequency is more suppressed in the case where the frame frequencies satisfy a relation represented by the following formula (1). In the following formula (1), $F_3$ corresponds to $F_{3\_1}$ (when the number of frame periods in the transition period is 1, $F_3 = F_{3\_1}$).

[Math. 11]

$$0.4 \leq \frac{F_1 F_2}{F_3 (F_1 + F_2)} \leq 0.6 \quad (1)$$

[Evaluation 4]

Evaluation was made for preferred relations of the frame frequencies between the first driving period, the second driving period, and the transition period in the case where the number of frame periods in the transition period was an even number of 2 or greater (Classification Example 2).

Specifically, in the display device of each of Examples 2 and 37 to 46, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 17 shows the simulation results. In Table 17, Y indicates values calculated from the following formula (y).

[Math. 12]

$$Y = \frac{\sum_1^n \left( \frac{1}{F_{3\_2n}} - \frac{1}{F_{3\_2n-1}} \right)}{\frac{1}{F_2} - \frac{1}{F_1}} \quad (y)$$

TABLE 17

|  | $F_1$ (Hz) | $F_{3\_1}$ (Hz) | $F_{3\_2}$ (Hz) | $F_{3\_3}$ (Hz) | $F_{3\_4}$ (Hz) | $F_2$ (Hz) | Y | $|\Delta V_{DC\_LC}|$ (mV) |
|---|---|---|---|---|---|---|---|---|
| Example 37 | 60 | 20 | 4 | — | — | 1 | 0.20 | 30 |
| Example 38 | 60 | 20 | 2.9 | — | — | 1 | 0.30 | 20 |
| Example 39 | 60 | 20 | 2.25 | — | — | 1 | 0.40 | 10 |
| Example 44 | 60 | 10 | 2 | — | — | 1 | 0.41 | 10 |
| Example 2 | 60 | 30 | 1 | — | — | 0.5 | 0.49 | 3 |
| Example 40 | 60 | 20 | 1.87 | — | — | 1 | 0.49 | 1 |
| Example 45 | 60 | 10 | 1.71 | — | — | 1 | 0.49 | 1 |
| Example 46 | 60 | 45 | 30 | 90 | 1 | 0.5 | 0.50 | 1 |
| Example 41 | 60 | 20 | 1.57 | — | — | 1 | 0.60 | 16 |
| Example 42 | 60 | 20 | 1.35 | — | — | 1 | 0.70 | 24 |
| Example 43 | 60 | 20 | 1.2 | — | — | 1 | 0.80 | 32 |

As shown in Table 17, in Examples 2 and 37 to 46, Vcom shift when changing the frame frequency was suppressed. In particular, Vcom shift was more suppressed in Examples 2, 39 to 41, and 44 to 46. This shows that Vcom shift when changing the frame frequency is more suppressed in the case where the frame frequencies satisfy a relation represented by the following formula (2).

[Math. 13]

$$0.4 \leq \frac{\sum_1^n \left( \frac{1}{F_{3\_2n}} - \frac{1}{F_{3\_2n-1}} \right)}{\frac{1}{F_2} + \frac{1}{F_1}} \leq 0.6 \quad (2)$$

In the formula (2), n is an integer of 1 or greater.

[Evaluation 5]

Evaluation was made for preferred relations of the frame frequencies between the first driving period, the second driving period, and the transition period in the case where the number of frame periods in the transition period was an odd number of 3 or greater (Classification Example 3).

Specifically, in the display device of each of Examples 3 to 6 and 47 to 52, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Table 18 shows the simulation results. In Table 18, Z indicates values calculated from the following formula (z).

[Math. 14]

$$Z = \frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} \quad (z)$$

TABLE 18

|  | $F_1$ (Hz) | $F_{3\_1}$ (Hz) | $F_{3\_2}$ (Hz) | $F_{3\_3}$ (Hz) | $F_2$ (Hz) | Z | $|\Delta V_{DC\_LC}|$ (mV) |
|---|---|---|---|---|---|---|---|
| Example 47 | 60 | 30 | 40 | 5 | 1 | 0.20 | 30 |
| Example 48 | 60 | 30 | 40 | 3.4 | 1 | 0.30 | 21 |
| Example 49 | 60 | 30 | 40 | 2.5 | 1 | 0.40 | 10 |
| Example 6 | 60 | 90 | 90 | 2 | 1 | 0.49 | 0 |
| Example 5 | 60 | 30 | 30 | 1 | 0.5 | 0.50 | 2 |
| Example 50 | 60 | 30 | 40 | 2 | 1 | 0.50 | 0 |
| Example 3 | 120 | 5 | 40 | 3 | 1 | 0.50 | 0 |
| Example 4 | 60 | 20 | 30 | 1 | 0.5 | 0.50 | 1 |
| Example 51 | 60 | 30 | 40 | 1.67 | 1 | 0.60 | 17 |
| Example 52 | 60 | 30 | 40 | 1.42 | 1 | 0.70 | 26 |

As shown in Table 18, in Examples 3 to 6 and 47 to 52, Vcom shift when changing the frame frequency was suppressed. In particular, Vcom shift was more suppressed in Examples 3 to 6 and 49 to 51. This shows that Vcom shift when changing the frame frequency is more suppressed when the frame frequencies satisfy a relation represented by the following formula (3).

[Math. 15]

$$0.4 \leq \frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} \leq 0.6 \quad (3)$$

In the formula (3), n is an integer of 1 or greater.

[Evaluation 6]

Figure 31:
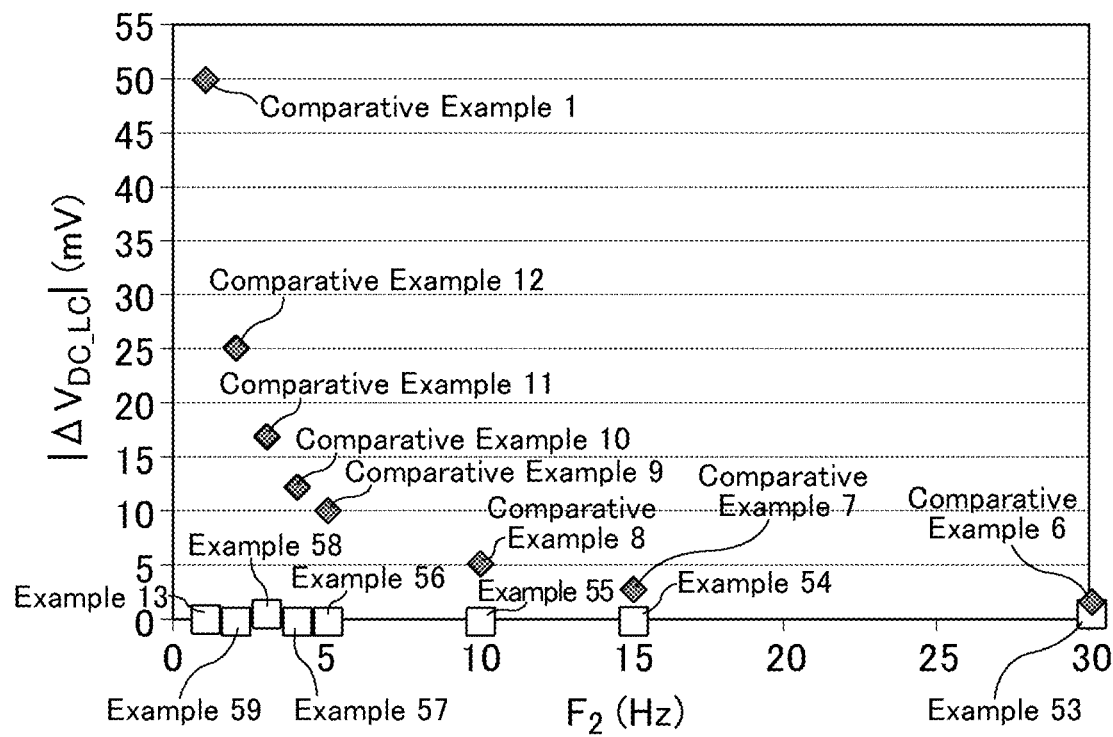
FIG. 31 is a graph showing the results of simulation for display devices of Examples 13 and 53 to 59 and Comparative Examples 1 and 6 to 12.

In the display device of each of Examples 13 and 53 to 59 and Comparative Examples 1 and 6 to 12, the variation amount ($|\Delta V_{DC\_LC}|$) of the DC voltage component $V_{DC\_LC}$ applied to the liquid crystal layer was calculated with a SPICE simulator when switching from the first frame frequency $F_1$ (first driving period) to the second frame frequency $F_2$ (second driving period) using the aforementioned image signal for driving. Tables 19 and 20 show the simulation results and FIG. 31 shows a graph of the simulation results. FIG. 31 is a graph showing the results of simulation for display devices of Examples 13 and 53 to 59 and Comparative Examples 1 and 6 to 12.

TABLE 19

|  | $F_1$ (Hz) | $F_{3\_1}$ (Hz) | $F_2$ (Hz) | $|\Delta V_{DC\_LC}|$ (mV) |
|---|---|---|---|---|
| Example 53 | 60 | 40 | 30 | <1 |
| Example 54 | 60 | 24 | 15 | <1 |
| Example 55 | 60 | 17 | 10 | <1 |
| Example 56 | 60 | 9.2 | 5 | <1 |
| Example 57 | 60 | 7.5 | 4 | <1 |
| Example 58 | 60 | 5.7 | 3 | <1 |
| Example 59 | 60 | 3.9 | 2 | <1 |
| Example 13 | 60 | 2 | 1 | <1 |

TABLE 20

|  | $F_1$ (Hz) | $F_{3\_1}$ (Hz) | $F_2$ (Hz) | $|\Delta V_{DC\_LC}|$ (mV) |
|---|---|---|---|---|
| Comparative Example 6 | 60 | — | 30 | 2 |
| Comparative Example 7 | 60 | — | 15 | 3 |
| Comparative Example 8 | 60 | — | 10 | 5 |
| Comparative Example 9 | 60 | — | 5 | 10 |
| Comparative Example 10 | 60 | — | 4 | 12 |
| Comparative Example 11 | 60 | — | 3 | 17 |
| Comparative Example 12 | 60 | — | 2 | 25 |
| Comparative Example 1 | 60 | — | 1 | 50 |

As shown in Table 19 and FIG. 31, in Examples 13 and 53 to 59, the variation in DC voltage component $V_{DC\_LC}$ applied to the liquid crystal layer when changing the frame frequency was suppressed. Meanwhile, as shown in Table 20 and FIG. 31, in Comparative Examples 1 and 6 to 12, the variation in DC voltage component $V_{DC\_LC}$ applied to the liquid crystal layer when changing the frame frequency was large. Here, in Comparative Examples 1 and 6 to 12, the variation in DC voltage component $V_{DC\_LC}$ applied to the liquid crystal layer was larger when the second frame frequency $F_2$ was 10 Hz or lower. In contrast, in Examples 13 and 53 to 59, the variation in DC voltage component $V_{DC\_LC}$ applied to the liquid crystal layer was suppressed even when the second frame frequency $F_2$ was 10 Hz or lower. This shows that the effects of the present invention can be exerted even when the frame frequency of the first frame frequency $F_1$ or the second frame frequency $F_2$, whichever has a lower frame frequency, (in the present evaluation, the second frame frequency $F_2$) is 10 Hz or lower. Although the transition period of each example included one frame period in the present evaluation, the similar effects were confirmed to be exerted even when the transition period includes multiple frame periods.

Although the simulation was performed for an FFS mode liquid crystal display device (Structure Example 1) in Evaluations 1 to 6, the similar effects were confirmed to be exerted in IPS mode, TN mode, or VA mode liquid crystal display devices (Structure Examples 2 to 4).

[Additional Remarks]

An aspect of the present invention may be a display device including: a display part including a common electrode; a driving part configured to drive the display part; and a display control part configured to control the driving part, the display control part being configured to perform control for AC drive of the display part, with a voltage applied to the common electrode defined as a reference and to provide a transition period between a first driving period and a second driving period in switching from the first driving period to the second driving period, the first driving period allowing the display part to be driven at a first frame frequency, the second driving period allowing the display part to be driven at a second frame frequency different from the first frame frequency, the transition period including a period where the display part is driven at least one frame frequency with a value between the first frame frequency and the second frame frequency, the transition period including, with a voltage applied to the common electrode defined as a reference, a positive period and a negative period that last for different total durations, the positive period allowing the display part to be driven at a positive voltage, the negative period allowing the display part to be driven at a negative voltage. This aspect can achieve a display device that can change the frame frequency with reduced flickers.

At least one period selected from the group consisting of the first driving period, the second driving period, and the transition period may include a frame period including a refreshing period that refreshes a screen of the display part and a pause period that is longer than the refreshing period and stops refreshing the screen of the display part. This structure (pause driving) achieves lower power consumption than driving that performs refreshment only.

There may be a difference between polarity of the positive period or the negative period in the transition period, whichever has a longer total duration, and polarity of a frame period that belongs to the first driving period or the second driving period, whichever has a lower frame frequency, and is closest to the transition period. This structure can more suppress Vcom shift when changing the frame frequency (switching from the first frame frequency to the second frame frequency). This results in better suppression of flickers.

The number of frame periods in the transition period may be 1. In this case, provided that $F_1$ represents the first frame frequency (unit: Hz), $F_2$ represents the second frame frequency (unit: Hz), and $F_3$ represents the frame frequency (unit: Hz) in the transition period, the frame frequencies may satisfy the following formula (1). This structure can more suppress Vcom shift when changing the frame frequency (switching from the first frame frequency to the second frame frequency). This results in better suppression of flickers.

[Math. 16]

$$0.4 \leq \frac{F_1 F_2}{F_3(F_1 + F_2)} \leq 0.6 \quad (1)$$

The number of frame periods in the transition period may be an even number of 2 or greater. In this case, provided that $F_1$ represents the first frame frequency (unit: Hz), $F_2$ represents the second frame frequency (unit: Hz), and $F_{3\_1}$, $F_{3\_2}$, ..., $F_{3\_2n-1}$, and $F_{3\_2n}$ represent frame frequencies (unit: Hz) in the transition period in the order from a first driving period side to a second driving period side, the frame frequencies may satisfy the following formula (2). This structure can more suppress Vcom shift when changing the frame frequency (switching from the first frame frequency to the second frame frequency). This results in better suppression of flickers.

[Math. 17]

$$0.4 \leq \frac{\sum_{1}^{n}\left(\frac{1}{F_{3\_2n}} - \frac{1}{F_{3\_2n-1}}\right)}{\frac{1}{F_2} - \frac{1}{F_1}} \leq 0.6 \quad (2)$$

In the formula (2), n is an integer of 1 or greater.

The number of frame periods in the transition period may be an odd number of 3 or greater. In this case, provided that $F_1$ represents the first frame frequency (unit: Hz), $F_2$ represents the second frame frequency (unit: Hz), and $F_{3\_1}$, $F_{3\_2}$, ..., and $F_{3\_2n}$, and $F_{3\_2n+1}$ represent frame frequencies (unit: Hz) in the transition period in the order from a first driving period side to a second driving period side, the frame frequencies may satisfy the following formula (3). This structure can more suppress Vcom shift when changing the frame frequency (switching from the first frame frequency to the second frame frequency). This results in better suppression of flickers.

[Math. 18]

$$0.4 \leq \frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} \leq 0.6 \quad (3)$$

In the formula (3), n is an integer of 1 or greater.

The first frame frequency or the second frame frequency, having a lower frame frequency, may have a frame frequency of 10 Hz or lower. This structure can effectively suppress Vcom shift even when the lower frame frequency of the first frame frequency and the second frame frequency is 10 Hz or lower.

The display part may further include a thin film transistor element, and the thin film transistor element may include a semiconductor layer including an oxide semiconductor. This structure simultaneously achieves low power consumption and high-speed driving.

The display device may be a liquid crystal display device. This structure enables effective use of the present invention even when the display device is a liquid crystal display device.

REFERENCE SIGNS LIST

1: Display device
2: System control unit
10: Display part
11: Pixel
12: Thin film transistor element
13: Pixel electrode
14: Common electrode
20: Power generation circuit
30: Display control circuit
40: Scanning line drive circuit
50: Signal line drive circuit
60a, 60b, 60c, 60d: First substrate
61: First alignment film
62: Liquid crystal layer
63: Second alignment film
64a, 64b: Second substrate 65: First supporting substrate
66: First insulating film
67: Second insulating film
68: Black matrix
69: Color filter
70: Second supporting substrate
GL1 to GLm: Scanning line
SL1 to SLn: Signal line
Cp: Pixel capacitance
GCT: Scanning line control signal
SCT: Signal line control signal
Vcom: Common voltage
$EA_1, EA_2, EA_3, EB_1, EB_2, EB_3, EC_1, EC_2, EC_3, EC_4, ED_1$: Erectric field
A1, A2, A3, B1, B2, B3, C1, C2, C3, C4, D1, D2: Circuit
$C_{61}$: Capacitance of first alignment film
$C_{62}$: Capacitance of liquid crystal layer
$C_{63}$: Capacitance of second alignment film
$C_{65}$: Capacitance of first supporting substrate
$C_{66}$: Capacitance of first insulating film
Cs: Storage capacitance
$R_{61}$: Resistance of first alignment film
$R_{62}$: Resistance of liquid crystal layer
$R_{63}$: Resistance of second alignment film
$R_{65}$: Resistance of first supporting substrate
$R_{66}$: Resistance of first insulating film
Rs: Resistance between pixel electrodes and common electrode
$F_1$: First frame frequency
$F_2$: Second frame frequency
$F_3, F_{3\_1}, F_{3\_2}, \ldots, F_{3\_2n-1}, F_{3\_2n}, F_{3\_2n+1}$: Frame frequency in the transition period
$T_{p1}, T_{n1}, T_{n2}, T_1, T_2, T_3, T_{3\_1}, T_{3\_2}, \ldots, T_{3\_2n-1}, T_{3\_2n}, T_{3\_2n+1}$: Length (time) of the frame period
$V_{DC\_LC}$: DC voltage component applied to liquid crystal layer
$|\Delta V_{DC\_LC}|$: Variation amount of DC voltage component applied to liquid crystal layer

The invention claimed is:

1. A display device comprising:
a display including a common electrode;
driving circuitry to drive the display; and
display control circuitry to control the driving circuitry,
the display control circuitry performing control for AC drive of the display, with a voltage applied to the common electrode defined as a reference and to provide a transition period between a first driving period and a second driving period in switching from the first driving period to the second driving period, the first driving period allowing the display to be driven at a first frame frequency, the second driving period allowing the display to be driven at a second frame frequency different from the first frame frequency, the transition period including a period where the display is driven at at least one frame frequency with a value between the first frame frequency and the second frame frequency,
the transition period including, with a voltage applied to the common electrode defined as a reference, a positive period and a negative period that last for different total durations, the positive period allowing the display to be driven at a positive voltage, the negative period allowing the display to be driven at a negative voltage, wherein
a number of frame periods in the transition period is 1, and provided that $F_1$ represents the first frame frequency (unit: Hz), $F_2$ represents the second frame frequency (unit: Hz), and $F_3$ represents the frame frequency (unit: Hz) in the transition period, the frame frequencies satisfy the following formula (1):

$$0.4 \leq \frac{F_1 F_2}{F_3(F_1 + F_2)} \leq 0.6. \qquad (1)$$

2. The display device according to claim 1, wherein at least one period selected from the group consisting of the first driving period, the second driving period, and the transition period includes a frame period including a refreshing period that refreshes a screen of the display and a pause period that is longer than the refreshing period and stops refreshing the screen of the display.

3. The display device according to claim 1, wherein there is a difference between a polarity of the positive period or the negative period in the transition period, whichever has a longer total duration, and a polarity of a frame period that belongs to the first driving period or the second driving period, whichever has a lower frame frequency, and is closest to the transition period.

4. The display device according to claim 1, wherein the first frame frequency or the second frame frequency, having a lower frame frequency, has a frame frequency of 10 Hz or lower.

5. The display device according to claim 1, wherein
the display further includes a thin film transistor element, and
the thin film transistor element includes a semiconductor layer including an oxide semiconductor.

6. The display device according to claim 1, wherein the display device is a liquid crystal display device.

7. A display device comprising:
a display including a common electrode;
driving circuitry to drive the display; and
display control circuitry to control the driving circuitry,
the display control circuitry performing control for AC drive of the display, with a voltage applied to the common electrode defined as a reference and to provide a transition period between a first driving period and a second driving period in switching from the first driving period to the second driving period, the first driving period allowing the display to be driven at a first frame frequency, the second driving period allowing the display to be driven at a second frame frequency different from the first frame frequency, the transition period including a period where the display is driven at at least one frame frequency with a value between the first frame frequency and the second frame frequency,
the transition period including, with a voltage applied to the common electrode defined as a reference, a positive period and a negative period that last for different total durations, the positive period allowing the display to be driven at a positive voltage, the negative period allowing the display to be driven at a negative voltage, wherein
a number of frame periods in the transition period is an even number of 2 or greater, and
provided that $F_1$ represents the first frame frequency (unit: Hz), F2 represents the second frame frequency (unit: Hz), and $F_{3\_1}, F_{3\_2}, \ldots, F_{3\_2n-1}$, and $F_{3\_2n}$ represent frame frequencies (unit: Hz) in the transition period in the order from a first driving period side to a second driving period side, the frame frequencies satisfy the following formula (2):

$$0.4 \leq \frac{\sum_{1}^{n}\left(\frac{1}{F_{3\_2n}} - \frac{1}{F_{3\_2n-1}}\right)}{\frac{1}{F_2} - \frac{1}{F_1}} \leq 0.6 \qquad (2)$$

wherein n is an integer of 1 or greater.

8. The display device according to claim 7, wherein at least one period selected from the group consisting of the first driving period, the second driving period, and the transition period includes a frame period including a refreshing period that refreshes a screen of the display and a pause period that is longer than the refreshing period and stops refreshing the screen of the display.

9. The display device according to claim 7, wherein there is a difference between a polarity of the positive period or the negative period in the transition period, whichever has a longer total duration, and a polarity of a frame period that belongs to the first driving period or the second driving period, whichever has a lower frame frequency and is closest to the transition period.

10. The display device according to claim 7, wherein the first frame frequency or the second frame frequency, having a lower frame frequency, has a frame frequency of 10 Hz or lower.

11. The display device according to claim 7, wherein
the display further includes a thin film transistor element, and
the thin film transistor element includes a semiconductor layer including an oxide semiconductor.

12. The display device according to claim 7, wherein the display device is a liquid crystal display device.

13. A display device comprising:
a display including a common electrode;
driving circuitry to drive the display; and
display control circuitry to control the driving circuitry,
the display control circuitry performing control for AC drive of the display, with a voltage applied to the common electrode defined as a reference and to provide a transition period between a first driving period and a second driving period in switching from the first driving period to the second driving period, the first driving period allowing the display to be driven at a first frame frequency, the second driving period allowing the display to be driven at a second frame frequency different from the first frame frequency, the transition period including a period where the display is driven at at least one frame frequency with a value between the first frame frequency and the second frame frequency, the transition period including, with a voltage applied to the common electrode defined as a reference, a positive period and a negative period that last for different total durations, the positive period allowing the display to be driven at a positive voltage, the negative period allowing the display to be driven at a negative voltage, wherein
a number of frame periods in the transition period is an odd number of 3 or greater, and
provided that $F_1$ represents the first frame frequency (unit: Hz), $F_2$ represents the second frame frequency (unit: Hz), and $F_{3\_1}$, $F_{3\_2}$, ..., $F_{3\_2n}$, and $F_{3\_2n+1}$ represent frame frequencies (unit: Hz) in the transition period in the order from a first driving period side to a second driving period side, the frame frequencies satisfy the following formula (3):

$$0.4 \leq \frac{\frac{1}{F_{3\_1}} + \sum_{1}^{n}\left(\frac{1}{F_{3\_2n+1}} - \frac{1}{F_{3\_2n}}\right)}{\frac{1}{F_2} + \frac{1}{F_1}} \leq 0.6 \qquad (3)$$

wherein n is an integer of 1 or greater.

14. The display device according to claim 13, wherein at least one period selected from the group consisting of the first driving period, the second driving period, and the transition period includes a frame period including a refreshing period that refreshes a screen of the display and a pause period that is longer than the refreshing period and stops refreshing the screen of the display.

15. The display device according to claim 13, wherein there is a difference between a polarity of the positive period or the negative period in the transition period, whichever has a longer total duration, and a polarity of a frame period that belongs to the first driving period or the second driving period, whichever has a lower frame frequency and is closest to the transition period.

16. The display device according to claim 13, wherein the first frame frequency or the second frame frequency, having a lower frame frequency, has a frame frequency of 10 Hz or lower.

17. The display device according to claim 13, wherein the display further includes a thin film transistor element, and the thin film transistor element includes a semiconductor layer including an oxide semiconductor.

18. The display device according to claim 13, wherein the display device is a liquid crystal display device.

* * * * *